(12) United States Patent
Mizutani et al.

(10) Patent No.: US 11,942,119 B2
(45) Date of Patent: Mar. 26, 2024

(54) MAGNETIC RECORDING/REPRODUCING APPARATUS AND METHOD FOR MANUFACTURING THE SAME

(71) Applicants: Kabushiki Kaisha Toshiba, Tokyo (JP); Toshiba Electronic Devices & Storage Corporation, Tokyo (JP)

(72) Inventors: Akiyo Mizutani, Kanagawa (JP); Koji Sonoda, Kanagawa (JP); Makoto Okamoto, Tokyo (JP); Takuma Kido, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/590,739

(22) Filed: Feb. 1, 2022

(65) Prior Publication Data

US 2022/0375502 A1    Nov. 24, 2022

(30) Foreign Application Priority Data

May 24, 2021  (JP) .................................. 2021-086957

(51) Int. Cl.
*G11B 33/14*    (2006.01)
*G11B 20/18*    (2006.01)

(52) U.S. Cl.
CPC ...... *G11B 33/1466* (2013.01); *G11B 20/1816* (2013.01); *G11B 33/146* (2013.01)

(58) Field of Classification Search
None
See application file for complete search history.

(56) References Cited

U.S. PATENT DOCUMENTS

| | | | | |
|---|---|---|---|---|
| 5,367,417 A | * | 11/1994 | Brown | G11B 33/1486 360/97.18 |
| 5,590,001 A | * | 12/1996 | Ino | G11B 25/043 360/97.18 |
| 5,718,993 A | * | 2/1998 | Kamiyama | G03G 5/02 430/48 |
| 6,205,845 B1 | * | 3/2001 | Dinsmore | G11B 33/08 73/52 |
| 7,486,474 B2 | * | 2/2009 | Shin | G11B 33/1446 360/97.18 |
| 7,686,871 B2 | * | 3/2010 | Oh | B01D 46/0036 55/491 |
| 8,254,056 B2 | * | 8/2012 | Ichikawa | G11B 25/043 360/97.18 |
| 8,760,797 B1 | | 6/2014 | Beatty et al. | |
| 8,776,832 B2 | | 7/2014 | Tuma | |
| 8,885,290 B1 | * | 11/2014 | Gustafson | G11B 25/043 360/97.16 |

(Continued)

FOREIGN PATENT DOCUMENTS

| | | | | |
|---|---|---|---|---|
| CN | 104004465 A | * | 8/2014 | ............ B32B 15/00 |
| CN | 104700847 A | * | 6/2015 | ............ B23K 1/001 |

(Continued)

*Primary Examiner* — William J Klimowicz
(74) *Attorney, Agent, or Firm* — Knobbe Martens Olson & Bear LLP

(57) ABSTRACT

According to one embodiment, a magnetic recording/reproducing apparatus includes irreversible adsorbing materials in a sealed housing for the magnetic recording/reproducing apparatus.

8 Claims, 12 Drawing Sheets

(56) References Cited

U.S. PATENT DOCUMENTS

| | | | | |
|---|---|---|---|---|
| 8,908,319 | B1* | 12/2014 | Gustafson | G11B 33/1453 |
| | | | | 360/97.16 |
| 10,388,328 | B1* | 8/2019 | Tan | B01D 46/0036 |
| 10,424,336 | B1 | 9/2019 | Kraus | |
| 10,971,195 | B2* | 4/2021 | Kraus | B01D 53/261 |
| 2004/0114273 | A1* | 6/2004 | Fujiwara | G11B 25/043 |
| 2005/0063093 | A1* | 3/2005 | Hong | G11B 33/1486 |
| | | | | 360/97.18 |
| 2007/0289971 | A1* | 12/2007 | Olszewski | F16K 15/144 |
| | | | | 220/361 |
| 2008/0174910 | A1* | 7/2008 | Hirono | G11B 25/043 |
| | | | | 360/97.16 |
| 2008/0226534 | A1* | 9/2008 | Gidumal | G11B 33/1453 |
| 2011/0003101 | A1* | 1/2011 | Fuji | C08G 64/305 |
| | | | | 528/370 |
| 2011/0038076 | A1* | 2/2011 | Hayakawa | G11B 25/043 |
| | | | | 360/97.16 |
| 2011/0094091 | A1* | 4/2011 | Akagi | G11B 33/146 |
| | | | | 29/603.03 |
| 2017/0053679 | A1* | 2/2017 | Albrecht | G11B 33/148 |
| 2020/0066308 | A1 | 2/2020 | Kraus et al. | |
| 2020/0173263 | A1* | 6/2020 | Bertini | E21B 21/08 |
| 2022/0028430 | A1* | 1/2022 | Mizutani | B01D 46/0036 |

FOREIGN PATENT DOCUMENTS

| | | | | |
|---|---|---|---|---|
| EP | 0787764 | A2 * | 8/1997 | C08K 3/08 |
| JP | H0950095 | A * | 2/1997 | B65D 65/02 |
| JP | 2009-37694 | A | 2/2009 | |
| JP | 2009161746 | A * | 7/2009 | B65D 65/02 |
| JP | 2021034083 | A * | 3/2021 | B23K 1/001 |

\* cited by examiner

MAGNETIC RECORDING/REPRODUCING APPARATUS AND METHOD FOR MANUFACTURING THE SAME

CROSS-REFERENCE TO RELATED APPLICATIONS

This application is based upon and claims the benefit of priority from Japanese Patent Application No. 2021-086957, filed May 24, 2021, the entire contents of which are incorporated herein by reference.

FIELD

Embodiments described herein relate generally to a magnetic recording/reproducing apparatus and a method for manufacturing the same.

BACKGROUND

Conventionally, activated carbon for adsorbing many organic substances or a porous body such as silica gel for adjusting humidity are used as an adsorbent for adsorbing a contaminated gas in a sealed hard disk drive (HDD). All of these porous bodies are reversible. For example, in activated carbon, an adsorption/desorption phenomenon occurs depending on the concentration and temperature of gas, and even in silica gel, the amount of moisture adsorbed changes depending on the humidity and temperature. The reversible porous body can be regenerated, and is effective when a large amount of organic gas or moisture is removed.

However, there is a contaminated gas which can cause a defect when even 1% or less of the contaminated gas is present in the HDD. For example, oxygen may oxidize a magnetic portion of a head to cause characteristic deterioration, and siloxane may generate fine particles in a gap between the head and the medium to cause a crash. However, an adsorbent such as activated carbon used in a conventional sealed HDD has a low ability to adsorb oxygen or siloxane, and it is necessary to add a special adsorbent in order to remove the oxygen or siloxane. Furthermore, since these adsorbents are reversible, once adsorbed, there is a possibility that it will be detached later. Therefore, it is desirable to use an irreversible adsorbent that does not desorb the adsorbed gas for removing oxygen, siloxane, and the like. Such irreversible adsorbing materials deteriorate its adsorption performance in several hours when exposed to air, and thus need to be incorporated into the HDD immediately before sealed.

DETAILED DESCRIPTION

Figure 1:
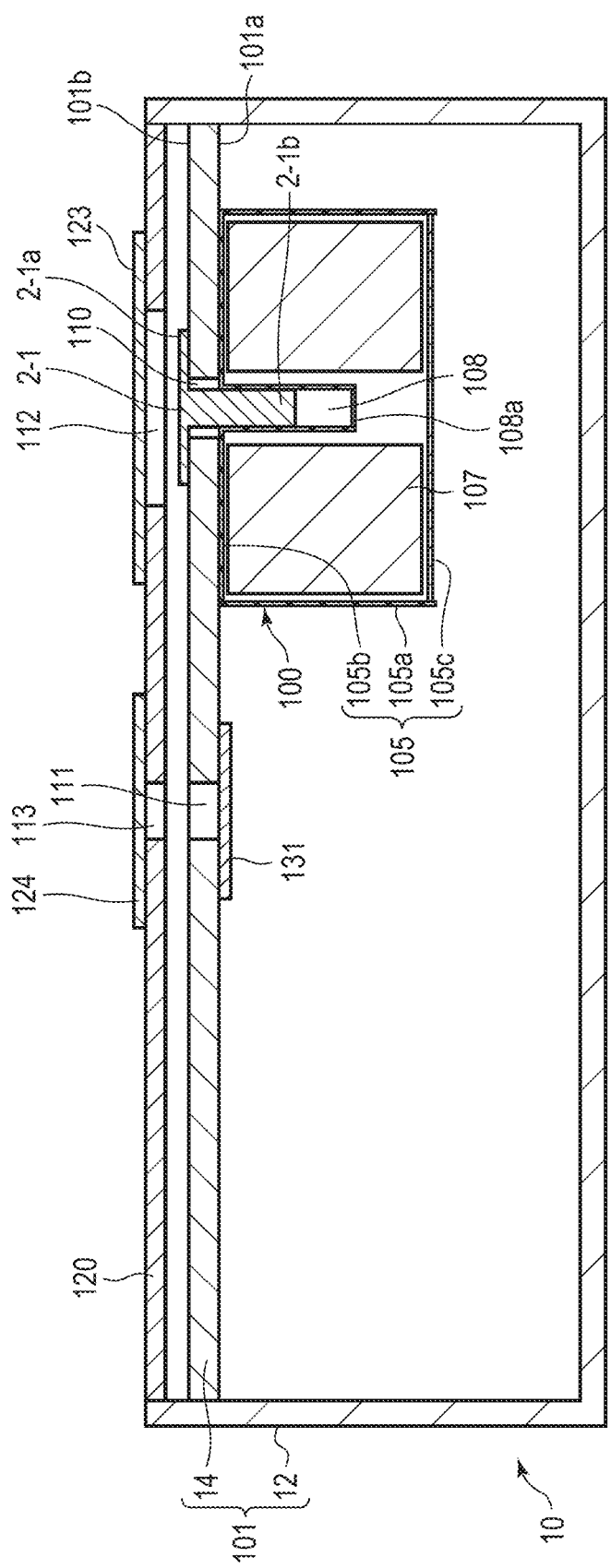
FIG. 1 is a schematic cross-sectional view illustrating an example of a structure of a magnetic recording/reproducing apparatus according to a first embodiment.

In general, according to one embodiment, a magnetic recording/reproducing apparatus including irreversible adsorbing materials in a sealed housing for a magnetic recording/reproducing apparatus is provided.

Embodiments of the present invention may include the following first to third embodiments.

A magnetic recording/reproducing apparatus according to a first embodiment includes irreversible adsorbing materials in the sealed housing for the magnetic recording/reproducing apparatus.

According to the magnetic recording/reproducing apparatus according to the first embodiment, it is possible to sufficiently adsorb a contaminated gas such as oxygen or siloxane in the magnetic recording/reproducing apparatus by incorporating the irreversible adsorbing materials in the sealed housing.

A method for manufacturing a magnetic recording/reproducing apparatus according to a second embodiment is an example of a method for obtaining the magnetic recording/reproducing apparatus according to the first embodiment, and includes attaching a component of the magnetic recording/reproducing apparatus into a housing, performing a test on the magnetic recording/reproducing apparatus, attaching irreversible adsorbing materials into the housing of the tested magnetic recording/reproducing apparatus, and subsequently sealing the housing.

According to the method for manufacturing a magnetic recording/reproducing apparatus according to the second embodiment, by attaching the irreversible adsorbing materials into the housing and subsequently sealing the housing, it is possible to reduce a time during which an irreversible adsorbing materials are exposed to air during manufacturing as much as possible to suppress the adsorption performance of the reversible adsorbing materials from deteriorating, and sufficiently adsorb the contaminated gas, such as oxygen or siloxane in the housing, to the irreversible adsorbing materials.

A method for manufacturing a magnetic recording/reproducing apparatus according to a third embodiment is an example of the method for obtaining a magnetic recording/reproducing apparatus according to the first embodiment, and includes attaching a component of a magnetic recording/reproducing apparatus and sealed inactive irreversible adsorbing materials into a housing, performing a test on the magnetic recording/reproducing apparatus, opening and activating the sealed irreversible adsorbing materials inside the housing of the tested magnetic recording/reproducing apparatus, and subsequently sealing the housing.

According to the method for manufacturing a magnetic recording/reproducing apparatus according to the third embodiment, by attaching the inactive irreversible adsorbing materials into the housing before the test, activating the irreversible adsorbing materials after the test, and subsequently sealing the housing, it is possible to reduce the time during which the irreversible adsorbing materials are exposed to air during manufacturing as much as possible, suppress the adsorption performance of the reversible adsorbing materials from deteriorating, and sufficiently adsorb the contaminated gas, such as oxygen or siloxane in the housing, to the irreversible adsorbing materials.

The irreversible adsorbing materials used in the embodiment is obtained by processing an irreversible adsorbent, and thus, a shape that can be easily mounted in a magnetic recording/reproducing apparatus is used.

Examples of the shape of the irreversible adsorbing materials include a pin type, a sheet type, and a bag type.

Hereinafter, an example in which irreversible adsorbing materials having various shapes are applied will be described in detail with reference to the drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

First Embodiment

FIG. 1 is a schematic cross-sectional view illustrating an example of a structure of a magnetic recording/reproducing apparatus according to a first embodiment.

Figure 2:
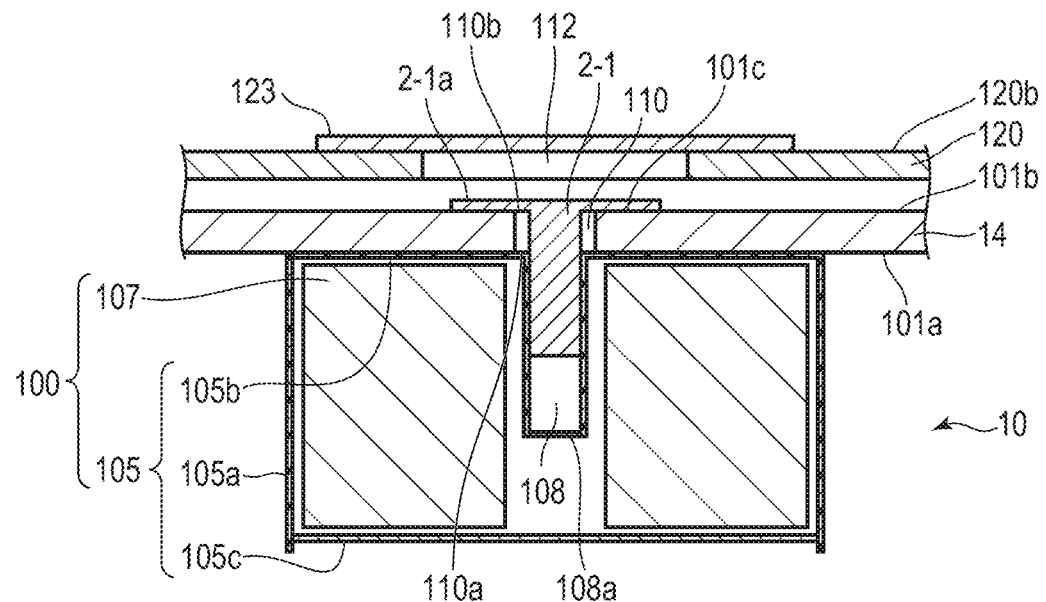
FIG. 2 is a partial enlarged view of FIG. 1.

FIG. 2 is a partial enlarged view of FIG. 1.

An example in which a magnetic recording/reproducing apparatus 10 uses pin-type irreversible adsorbing materials 2-1 as irreversible adsorbing materials and is attached to a breathing filter 100 will be described.

As illustrated, the housing 101 for the magnetic recording/reproducing apparatus 10 includes, for example, a metal case 12 and a metal top cover 14 for sealing the case 12. The case 12 houses components such as a magnetic recording medium and a magnetic head (not illustrated). As a breathing hole communicating from an inside of the housing 101 to an outside air, for example, the top cover 14 can be provided with a first opening hole 110 for a breathing filter and a second opening hole 111 into which an inert gas or the like can be injected. The first opening hole 110 connects a first opening 110a provided on an inner surface 101a of the top cover 14 and a second opening 110b provided on an outer surface 101b of the top cover 14. The breathing filter 100 used to adjust humidity in the apparatus is disposed in the vicinity of the first opening 110a. The pin-type irreversible adsorbing materials 2-1 is attached to the breathing filter 100 from an outside of the top cover 14 via the first opening hole 110. In addition, an air-permeable membrane filter 131 is provided in the opening of the second opening hole 111 on the inner surface 101a side in order to prevent intrusion of dust and the like.

As illustrated in FIG. 2, the breathing filter 100 is provided with a case 105 made of, for example, resin which has a bottom portion 105b, a side wall portion 105a, and an air-permeable member 105c provided in an opening portion facing the bottom portion 105b. A first adsorption layer 107 containing, for example, activated carbon and silica gel can be housed in the case 105. As the air-permeable member 105c, for example, an air-permeable membrane filter can be provided. The bottom portion 105b can be arranged to face the first opening 110a side, and has an opening hole 108 communicable with the first opening 110a. At least a part of the opening hole 108 has air permeability. Here, for example, as an air-permeable member 108a, for example, an air-permeable membrane filter is provided at an end portion of the opening hole 108.

The pin-type irreversible adsorbing materials 2-1 are inserted into the opening hole 110 of the top cover 14 and the opening hole 108 of the breathing filter 100, and a head top portion 2-1a of the pin-type irreversible adsorbing materials 2-1 is supported by a region 101c around the second opening 110b of the top cover 14. Therefore, a diameter of the head top portion 2-1a is larger than a hole diameter of the second opening 110b.

Figure 3:
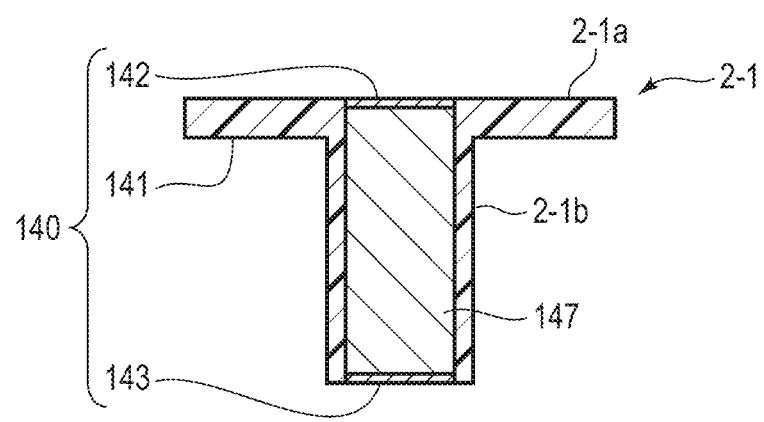
FIG. 3 is a schematic view illustrating a configuration of pin-type irreversible adsorbing materials.

FIG. 3 is a schematic view illustrating a configuration of the pin-type irreversible adsorbing materials.

As illustrated in FIG. 3, the pin-type irreversible adsorbing materials 2-1 include a pin-type case 140 and an irreversible adsorbent 147 that is provided in the case 140 and capable of irreversibly adsorbing contaminated gases such as oxygen, siloxane, and water vapor. The pin-type case 140 includes a disk-shaped head top portion 2-1a having an opening at a central portion thereof, and a cylindrical housing portion 2-1b that has an opening at both ends thereof and provided such that one opening communicates with an opening at a central portion of the head top portion 2-1a. In addition, for example, an air-permeable member 142 such as the air-permeable membrane filter is provided in one opening provided on the head top portion 2-1a side, and an air-permeable member 143 such as the air-permeable membrane filter is provided in the other opening facing the one opening. The irreversible adsorbent 147 is, for example, a granular shape, and is housed in the housing portion 2-1b.

In the magnetic recording/reproducing apparatus 10, a flow path between the inside of the housing 101 and the pin-type irreversible adsorbing materials 2-1 is secured via the air-permeable member 105c of the breathing filter 100 and the end portion 108a of the opening hole 108, and the contaminated gas in the housing 101 can be sufficiently adsorbed.

In addition, as illustrated in FIG. 1, the top cover 14 is covered with an outer cover 120 welded to the case 12. The outer cover 120 is formed of, for example, a metal sheet such as aluminum, and has a third opening hole 112 and a fourth opening hole 113 as breathing holes communicating from the inside of the housing 101 to the outside air at positions facing the first opening hole 110 and the second opening hole 111 of the top cover 14, respectively. In order to provide the pin-type irreversible adsorbing materials 2-1 on the top cover 14 via the third opening hole 112, a hole diameter of the third opening hole 112 is larger than the size of the head top portion 2-1a. The third opening hole 112 and the fourth opening hole 113 are closed by seals 123 and 124, respectively. As the seals 123 and 124, a sealing material using a metal sheet such as aluminum can be used.

The irreversible adsorbent usable in the embodiment is, for example, a material that irreversibly adsorbs the contaminated gas such as oxygen or siloxane.

As the irreversible adsorbent, irreversible adsorbents processed into various shapes such as a granular shape, a sheet shape, and a fibrous shape can be used. Examples of such an irreversible adsorbent include a deoxidizing agent such as AGELESS (registered trademark, manufactured by MITSUBISHI GAS CHEMICAL COMPANY, INC.) and a moisture absorbent such as molecular sieve.

Since the irreversible adsorbent 147 starts to adsorb oxygen as soon as it comes into contact with air and is saturated in several hours, the pin-type irreversible adsorbing materials 2-1 are stored in a low-humidity oxygen-free atmosphere until it is provided in the HDD, and can be taken out and used immediately before the HDD is sealed.

The head top portion 2-1a may have a diameter of, for example, 5 to 15 mm, and the housing portion 2-1b may have a diameter of 1 to 12 mm and a depth of, for example, 5 to 15 mm.

The first opening hole 110 and the second opening 110b are smaller than the diameter of the head top portion 2-1a, and can have a size equal to or larger than the diameter of the housing portion 2-1b and have a hole diameter of, for example, 4 to 13 mm.

The opening hole 108 of the breathing filter 100 is smaller than the diameter of the head top portion 2-1a, and can have a size equal to or larger than the diameter of the housing portion 2-1b, have a hole diameter of, for example, 4 to 13 mm, and have a depth of, for example, 6 to 16 mm.

The third opening hole 112 of the outer cover 120 can have a hole diameter sufficiently larger than the diameter of the head top portion 2-1a, and have a hole diameter of, for example, 6 to 16 mm.

In the magnetic recording/reproducing apparatus 10 according to the first embodiment, by using the pin-type irreversible adsorbing materials 2-1 that can be attached to the breathing filter 100 from the outside of the housing 101 via the first opening hole 110 and the third opening hole 112 provided in the housing, the pin-type irreversible adsorbing materials 2-1 can be attached after the top cover 14 and the outer cover 120 are attached to the case 12 of the housing 101. As a result, since the pin-type irreversible adsorbing materials 2-1 can be blocked from air and held until the housing 101 of the magnetic recording/reproducing apparatus 10 is sealed, the time during which the pin-type irreversible adsorbing materials 2-1 comes into contact with air during the manufacturing of the magnetic recording/reproducing apparatus can be minimized to minimize the risk of deteriorating the adsorption function. In such a magnetic recording/reproducing apparatus 10 according to the first embodiment, since the removal of the contaminated gas by the irreversible adsorbing materials is sufficiently performed, defects such as a head crash hardly occur. In addition, at the time of performing repair or the like, the breathing filter 100 can be regenerated by heating, vacuum drying, or the like and thus can be used as it is, but the irreversible adsorbing materials 2-1 cannot be regenerated and thus needs to be replaced. On the other hand, in the magnetic recording/reproducing apparatus 10 according to the first embodiment, the seal 123 can be peeled off without removing the top cover and the outer cover, and the irreversible adsorbing materials 2-1 can be replaced with a new one.

Figure 4:
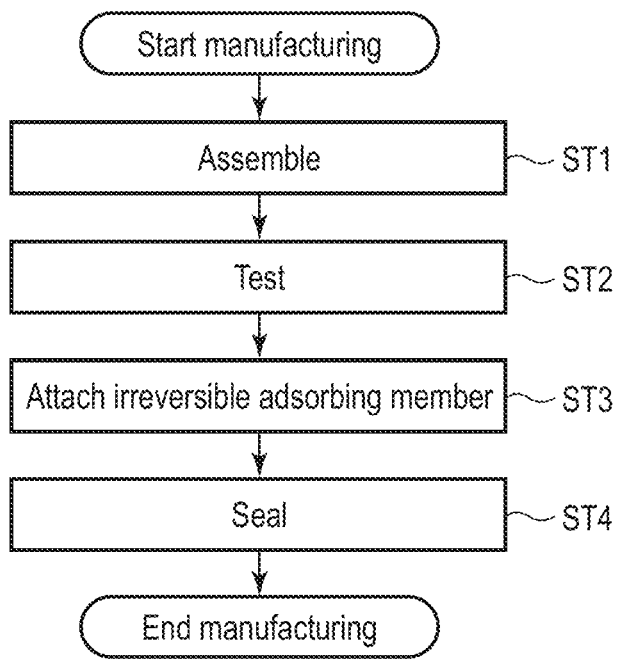
FIG. 4 is a flowchart illustrating an example of a method for manufacturing a magnetic recording/reproducing apparatus according to a second embodiment.

FIG. 4 is a flowchart illustrating an example of a method for manufacturing a magnetic recording/reproducing apparatus according to a second embodiment.

The magnetic recording/reproducing apparatus 10 can be manufactured as follows.

As illustrated in FIG. 1, first, components for the magnetic recording/reproducing apparatus such as a magnetic recording medium and a magnetic head, the top cover 14, and the outer cover 120 are attached to the case 12, thereby assembling a portion of the magnetic recording/reproducing apparatus (ST1).

Next, various tests such as operation confirmation and performance inspection of the magnetic recording/reproducing apparatus are performed (ST2).

Thereafter, after the air in the housing 101 is exhausted, an inert gas such as helium is introduced from the second opening hole 111 via the fourth opening hole 113 to adjust an internal pressure, and the cylindrical housing portion 2-1b of the pin-type irreversible adsorbing materials 2-1 is inserted into the first opening hole 110 of the top cover 14 and the opening hole 108 of the breathing filter 100 from the third opening hole 112 of the outer cover 120, so the pin-type irreversible adsorbing materials 2-1 are attached to the housing 101 (ST3).

Subsequently, the inside of the housing 101 is sealed by closing the third opening hole 112 and the fourth opening hole 113 of the outer cover 120 with the metal seals 123 and 124 made of, for example, aluminum (ST4), thereby obtaining the magnetic recording/reproducing apparatus 10.

As described above, in the method for manufacturing a magnetic recording/reproducing apparatus according to the second embodiment, the pin-type irreversible adsorbing materials 2-1 that can be attached to the breathing filter in the housing from the outside of the housing via the opening hole as the breathing hole is used for the magnetic recording/reproducing apparatus 10, so the pin-type irreversible adsorbing materials 2-1 can be attached to the housing after various tests of the magnetic recording/reproducing apparatus are completed.

Therefore, until the housing is sealed, the pin-type irreversible adsorbing materials are blocked from air and held, and the time during which the pin-type irreversible adsorbing materials 2-1 comes into contact with air can be minimized. As a result, in the method for manufacturing a magnetic recording/reproducing apparatus according to the second embodiment, the adsorption performance of the pin-type irreversible adsorbing materials to be used is less likely to deteriorate, and the contaminated gas such as oxygen or siloxane can be sufficiently adsorbed in the magnetic recording/reproducing apparatus after sealing.

Figure 5:
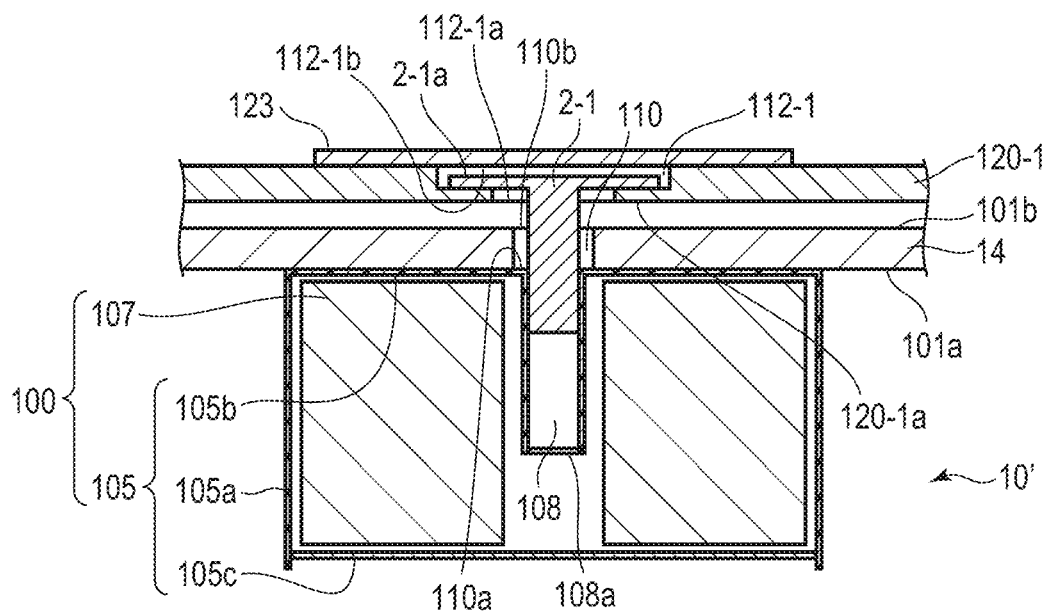
FIG. 5 is a partial enlarged view illustrating another example of the structure of the magnetic recording/reproducing apparatus according to the first embodiment.

FIG. 5 is a partial enlarged view illustrating another example of the structure of the magnetic recording/reproducing apparatus according to the first embodiment.

An example in which a magnetic recording/reproducing apparatus 10' uses pin-type irreversible adsorbing materials as irreversible adsorbing materials and is attached to a breathing filter will be described.

As illustrated, the magnetic recording/reproducing apparatus 10' is provided with an outer cover 120-1 that has a third opening hole 112-1 having a step. The third opening hole 112-1 has, for example, a two-stage hole diameter, a hole diameter of the second opening 112-1b on an outside air side is larger than a hole diameter of the first opening 112-1a on the top cover 14 side, a region 120-1a around a first opening 112-1a has a shape extending toward a center of the first opening 112-1a, and is a hole having a step. In addition, in the magnetic recording/reproducing apparatus 10', pin-type irreversible adsorbing materials 2-1 are inserted into the third opening hole 112-1 of the outer cover 120-1, a first opening hole 110 of a top cover 14, and an opening hole 108 of a breathing filter 100, and is attached such that a head top portion 2-1a of the pin-type irreversible adsorbing materials 2-1 is supported by a region 120-1a around the first opening 112-1a of the third opening hole 112-1 of the outer cover 120-1. For example, the first opening 112-1a of the third opening hole 112-1 of the outer cover 120-1 is smaller than a diameter of the head top portion 2-1a, and can have a hole diameter of, for example, 3 to 14 mm. In addition, a second opening 112-1b has a hole diameter sufficiently larger than the diameter of the head top portion 2-1a, and can have a hole diameter of, for example, 5 to 16 mm.

As described above, in the magnetic recording/reproducing apparatus 10', the third opening hole 112-1 of the outer cover 120-1 has a stepped shape, and the region by which the head top portion 2-1a of the pin-type irreversible adsorbing materials 2-1 is supported is in the outer cover 120-1. Other configurations of the magnetic recording/reproducing apparatus 10' are similar to those of the magnetic recording/reproducing apparatus 10.

In the magnetic recording/reproducing apparatus 10' according to the first embodiment, by using the pin-type irreversible adsorbing materials 2-1 that can be attached to the breathing filter 100 via the first opening hole 110 and the third opening hole 112 provided in the housing, the pin-type irreversible adsorbing materials 2-1 can be attached after the top cover 14 and the outer cover 120 are attached to the case 12 of the housing 101. As a result, since the pin-type irreversible adsorbing materials 2-1 can be blocked from air and held until the housing 101 of the magnetic recording/reproducing apparatus 10' is sealed, the time during which the pin-type irreversible adsorbing materials 2-1 comes into contact with air during the manufacturing of the magnetic recording/reproducing apparatus can be minimized to minimize the risk of deteriorating the adsorption function. In such a magnetic recording/reproducing apparatus 10' according to the first embodiment, since the removal of the contaminated gas by the irreversible adsorbing materials is sufficiently performed, defects such as a head crash hardly occur.

In addition, the magnetic recording/reproducing apparatus 10' can be manufactured in a similar manner to the magnetic recording/reproducing apparatus 10 except that the outer cover 120-1 having the third opening hole 112-1 having a two-stage hole diameter is used instead of the outer cover 120 having the third opening hole 112 without a step, and the pin-type irreversible adsorbing materials 2-1 are attached such that the head top portion 2-1a thereof is supported by a region 120-1a around the first opening 112-1a of the third opening hole 112-1 instead of being supported by the region 101c around the second opening 110b of the top cover 14.

An example in which the magnetic recording/reproducing apparatus of the first embodiment is applied to a hard disk drive (HDD) will be described in detail.

Figure 6:
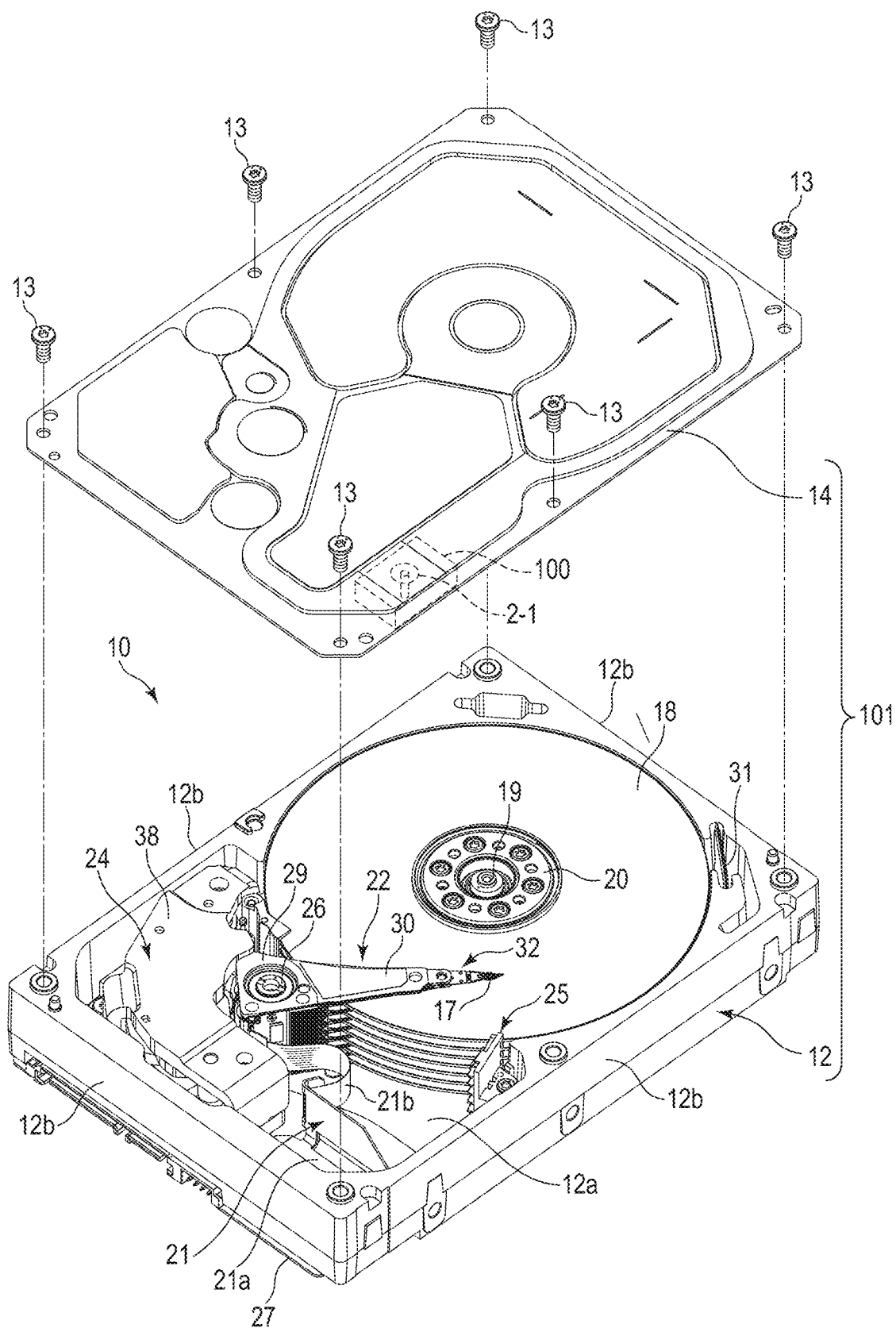
FIG. 6 is an exploded perspective view of the magnetic recording/reproducing apparatus according to the first embodiment.

FIG. 6 is an exploded perspective view of the magnetic recording/reproducing apparatus according to the first embodiment in which the top cover is removed.

The HDD as the magnetic recording/reproducing apparatus 10 includes a flat substantially rectangular housing 101. The housing 101 includes a rectangular box-shaped case 12 having an opened upper surface, and the top cover 14. The case 12 has a rectangular bottom wall 12a facing the top cover 14 with a gap, and a side wall 12b erected along a peripheral edge of the bottom wall, and is integrally molded of, for example, aluminum. The top cover 14 is made of, for example, stainless steel and formed in a rectangular plate shape. The top cover 14 is screwed onto the side wall 12b of the case 12 by a plurality of screws 13 to close the upper opening of the case 12.

In the housing 101, a plurality of magnetic disks 18 as disk-shaped magnetic recording media and a spindle motor 19 that supports and rotates the magnetic disks 18 are provided. The spindle motor 19 is disposed on the bottom wall 12a. Each magnetic disk 18 is formed to have a diameter of, for example, 88.9 mm (3.5 inches), and has a magnetic recording layer on an upper surface or a lower surface thereof. Each of the magnetic disks 18 is coaxially fitted to a hub (not illustrated) of the spindle motor 19, is clamped by a clamp spring 20, and is fixed to the hub. As a result, each magnetic disk 18 is supported in a state of being positioned in parallel with the bottom wall 12a of the case 12. Each magnetic disk 18 is rotated at a predetermined number of revolutions by the spindle motor 19.

Note that, here, for example, seven magnetic disks 18 are arranged in the housing 101, but the number of magnetic disks 18 is not limited thereto.

In the housing 101, a plurality of magnetic heads 17 that record and reproduce information to and from the magnetic disk 18, and an actuator assembly 22 that movably supports the magnetic heads 17 with respect to the magnetic disk 18 are provided. In addition, in the housing 101, a voice coil motor (VCM) 24 that rotates and positions the actuator assembly 22, a ramp load mechanism 25 that holds the magnetic head 17 at an unload position separated from the magnetic disk 18 when the magnetic head 17 moves to an outermost periphery of the magnetic disk 18, and a board unit (FPC unit) 21 on which electronic components such as a conversion connector are mounted are mounted.

A printed circuit board 27 is screwed to an outer surface of the bottom wall 12a of the case 12. The printed circuit board 27 constitutes a control unit that controls the operation of the spindle motor 19 and controls the operations of the VCM 24 and the magnetic head 17 via the board unit 21.

The actuator assembly 22 includes an actuator block 29, a plurality of, for example, eight arms 30 extending from the actuator block 29 in the same direction, and a plurality of head gimbal assembly (HGA) 32 attached to extending ends of the respective arms 30. The actuator block 29 is rotatably supported by a support shaft (pivot) 26 erected on the bottom wall 12a via a unit bearing. Each HGA 32 includes a suspension (load beam) extending from the arm 30, a flexure (wiring member) (not illustrated) arranged on the load beam and the arm 30, and a magnetic head 17 mounted on a gimbal portion of the flexure.

The actuator assembly 22 further includes a support frame (not illustrated) extending from the actuator block 29 in a direction opposite to the arm 30, and a voice coil attached to the support frame. The voice coil is located between a pair of yokes 38 provided on the bottom wall 12a, and constitutes the VCM 24 together with these yokes 38 and a magnet fixed to any one of the yokes 38.

The FPC unit 21 has a main body 21a formed of a flexible printed circuit board, and the main body 21a is fixed to a bottom wall 12a of the case 12. An electronic component such as a conversion connector is mounted on the main body 21a. The conversion connector penetrates the bottom wall 12a and is connected to the printed circuit board 27. The FPC unit 21 has a relay flexible printed circuit board (hereinafter, referred to as a relay FPC) 21b extending from the main body 21a. An extended end portion of the relay FPC 21b is attached to a side surface (installation surface) of the actuator block 29. The extended end portion of the relay FPC 21b is electrically connected to the magnetic head 17 via the flexure described above.

According to the present embodiment, the HDD further includes the breathing filter 100 for humidity adjustment provided in the housing 101, and the pin-type irreversible adsorbing materials 2-1 attached to the breathing filter 100 and adsorbing the contaminated gas such as oxygen or siloxane. The breathing filter 100 is fixed to an inner surface of the housing 101. The pin-type irreversible adsorbing materials 2-1 are inserted from the outer surface of the housing 101 and attached to the breathing filter 100. The outer cover (not illustrated) that seals the housing 101 can be further provided on the top cover 14. In addition, the top cover 14 and the outer cover can be provided with a first opening hole (not illustrated) as a breathing hole for the breathing filter 100 and a second opening hole different from the first opening hole, and can be used for attaching the pin-type irreversible adsorbing materials 2-1.

Second Embodiment

Figure 7:
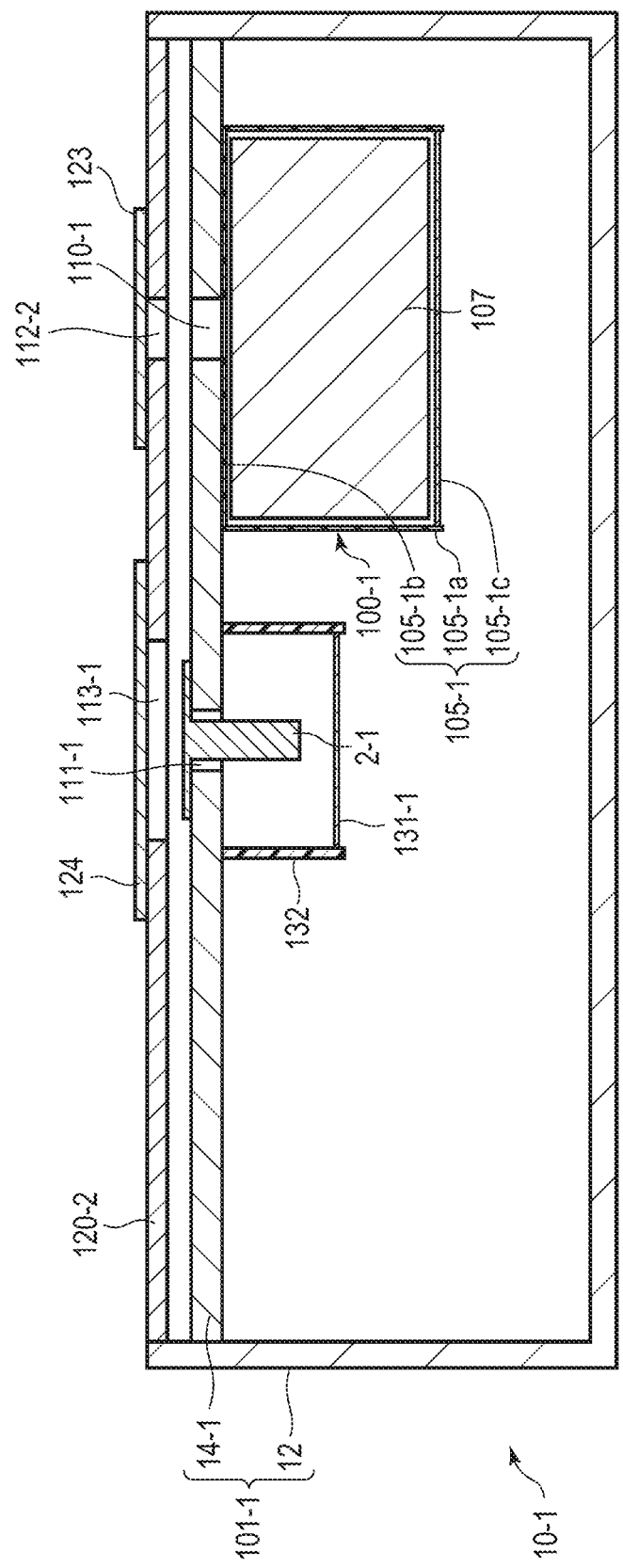
FIG. 7 is a schematic cross-sectional view illustrating another example of the structure of the magnetic recording/reproducing apparatus according to the first embodiment.

FIG. 7 is a schematic cross-sectional view illustrating another example of the structure of the magnetic recording/reproducing apparatus according to the first embodiment.

Figure 8:
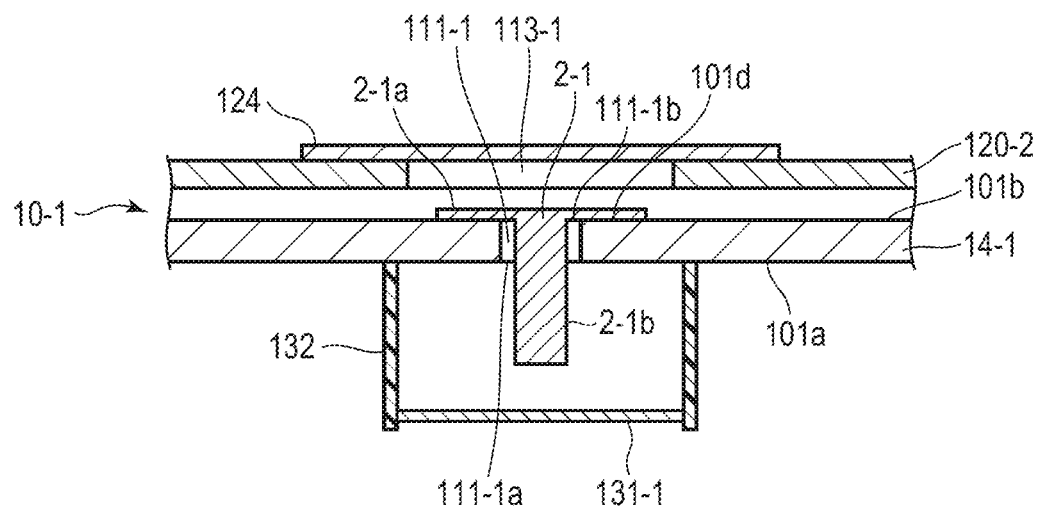
FIG. 8 is a partial enlarged view of FIG. 7.

FIG. 8 is a partial enlarged view of FIG. 7.

An example in which a magnetic recording/reproducing apparatus 10-1 uses pin-type irreversible adsorbing materials 2-1 as irreversible adsorbing materials and is attached to a second opening hole 111-1 will be described.

As illustrated, a housing 101-1 for the magnetic recording/reproducing apparatus 10-1 includes, for example, a metal case 12 and a metal top cover 14-1 for sealing the case 12. The case 12 houses components such as a magnetic recording medium and a magnetic head (not illustrated). As a breathing hole communicating from the inside of the housing 101-1 to the outside air, for example, the top cover 14-1 can be provided with a first opening hole 110-1 for a breathing filter and a second opening hole 111-1 into which an inert gas or the like can be injected. The second opening hole 111-1 connects a first opening 111-1a provided on an inner surface 101a of the top cover 14-1 and a second opening 111-1b provided on an outer surface 101b of the top cover 14-1. The inner side of the housing 101-1 of the first opening hole 110-1 is provided with the breathing filter 100-1 that includes a first adsorption layer 107 containing, for example, activated carbon and silica gel, which is used to control the humidity inside the apparatus and is housed in the case 105-1. The case 105-1 includes a main body made of, for example, resin that has a bottom portion 105-1b, a side wall portion 105-1a, and an opening portion facing the bottom portion 105-1b, and an air-permeable membrane filter 105-1c as an air-permeable member provided in the opening portion. In addition, the pin-type irreversible adsorbing materials 2-1 are attached to the second opening hole 111-1 from the outside of the top cover 14-1 via the second opening hole 111-1.

The pin-type irreversible adsorbing materials 2-1 have the same configuration as that of FIG. 3. A head top portion 2-1a of the pin-type irreversible adsorbing materials 2-1 is supported by a region 101d around the second opening 111-1b. Therefore, a diameter of the head top portion 2-1a is larger than a hole diameter of the second opening 111-1b. In addition, a cylindrical housing portion 2-1b is inserted into the second opening hole 111-1, and protrudes from the inner surface 101a of the top cover 14-1. A side wall 132 made of, for example, resin surrounding the protruding cylindrical housing portion 2-1b is provided around the opening 111-1a, and for example, an air-permeable membrane filter 131-1 is provided on an end surface of the side wall 132 on the inner side of the housing 101-1 in order to prevent intrusion of dust and the like.

In the magnetic recording/reproducing apparatus 10-1, a flow path between the inside of the housing 101 and the pin-type irreversible adsorbing materials 2-1 is secured via the air-permeable membrane filter 131-1, and the contaminated gas in the housing 101 can be sufficiently adsorbed.

In addition, as illustrated in FIG. 7, the top cover 14-1 is covered with an outer cover 120-2 welded to the case 12. The outer cover 120-2 is formed of, for example, a metal sheet such as aluminum, and has a third opening hole 112-2 and a fourth opening hole 113-1 at positions facing the first opening hole 110-1 and the second opening hole 111-1 of the top cover 14-1, respectively. In order to provide the pin-type irreversible adsorbing materials 2-1 on the top cover 14 via the fourth opening hole 113-1, a hole diameter of the fourth opening hole 113-1 is larger than the size of the head top portion 2-1a. The third opening hole 112-2 and the fourth opening hole 113-1 are closed by seals 123 and 124, respectively.

The second opening hole 111-1 is smaller than the diameter of the head top portion 2-1a, and can have a size equal to or larger than a diameter of the housing portion 2-1b and have a hole diameter of, for example, 2 to 13 mm.

The fourth opening hole 113-1 of the outer cover 120 can have a hole diameter sufficiently larger than the diameter of the head top portion 2-1a, and have a hole diameter of, for example, 6 to 16 mm.

As described above, in the magnetic recording/reproducing apparatus 10-1, the top cover 14-1 in which the pin-type irreversible adsorbing materials 2-1 is attached to the second opening hole 111-1, the side wall 132 made of, for example, a resin surrounding the pin-type irreversible adsorbing materials 2-1 around the opening 111-1a of the second opening hole 111-1, and the air-permeable membrane filter 131-1 on the end surface of the side wall 132 are further provided is used. Other configurations of the magnetic recording/reproducing apparatus 10-1 are similar to those of the magnetic recording/reproducing apparatus 10.

In the magnetic recording/reproducing apparatus 10-1 according to the first embodiment, by using the pin-type irreversible adsorbing materials 2-1 that can be attached to the second opening hole 111-1 from the outside of the housing 101-1 via the fourth opening hole 113-1, the pin-type irreversible adsorbing materials 2-1 can be attached after the top cover 14-1 and the outer cover 120-2 are attached to the case 12 of the housing 101-1. As a result, since the pin-type irreversible adsorbing materials 2-1 can be blocked from air and held until the housing 101-1 of the magnetic recording/reproducing apparatus 10-1 is sealed, the time during which the pin-type irreversible adsorbing materials 2-1 come into contact with air during the manufacturing of the magnetic recording/reproducing apparatus can be minimized to minimize the risk of deteriorating the adsorption function. In such a magnetic recording/reproducing apparatus 10-1 according to the first embodiment, since the removal of the contaminated gas by the irreversible adsorbing materials is sufficiently performed, defects such as a head crash hardly occur. In addition, when the magnetic recording/reproducing apparatus 10-1 according to the first embodiment is used, the irreversible adsorbing materials 2-1 can be replaced with a new one without removing the top cover and the outer cover at the time of performing repair or the like.

In addition, the magnetic recording/reproducing apparatus 10-1 of the second embodiment can be manufactured similarly to the magnetic recording/reproducing apparatus 10 of the first embodiment by applying another example of the method for manufacturing a magnetic recording/reproducing apparatus according to the second embodiment. However, in the second embodiment, instead of the breathing filter 100 having the opening hole 108 in the bottom portion 105*b* of the case, the breathing filter 100-1 having no opening hole in the bottom portion of the case 105-1 is used. In addition, in the second embodiment, instead of the top cover 14, the top cover 14-1 in which the side wall 132 made of, for example, a resin surrounding the pin-type irreversible adsorbing materials 2-1 around the opening 111-1*a* of the second opening hole 111-1, and an air-permeable membrane filter 131-1 on the end surface of the side wall 132 are further provided is used. Further, in the second embodiment, instead of attaching the pin-type irreversible adsorbing materials 2-1 to the breathing filter 100 from the outside of the housing 101, the pin-type irreversible adsorbing materials 2-1 are attached to the second opening hole 111-1 from the outside of the housing 101-1.

According to another example of the method for manufacturing a magnetic recording/reproducing apparatus according to the second embodiment, by using the pin-type irreversible adsorbing materials 2-1 that can be attached to the opening hole as the breathing hole from the outside of the housing in the magnetic recording/reproducing apparatus 10-1, the pin-type irreversible adsorbing materials 2-1 can be attached to the housing after various tests of the magnetic recording/reproducing apparatus are completed. Therefore, until the housing is sealed, the pin-type irreversible adsorbing materials are blocked from air and held, and the time during which the pin-type irreversible adsorbing materials 2-1 come into contact with air can be minimized. As a result, in the method for manufacturing a magnetic recording/reproducing apparatus according to the second embodiment, the adsorption performance of the pin-type irreversible adsorbing materials to be used is less likely to deteriorate, and the contaminated gas such as oxygen or siloxane can be sufficiently adsorbed in the magnetic recording/reproducing apparatus after sealing.

Figure 9:
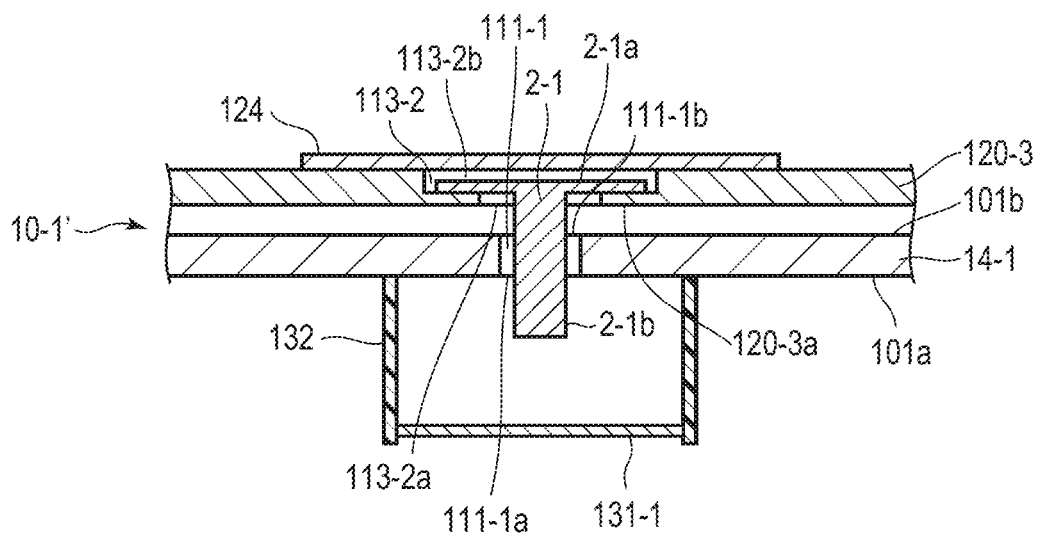
FIG. 9 is a partial enlarged view illustrating another example of the structure of the magnetic recording/reproducing apparatus according to the first embodiment.

FIG. 9 is a partial enlarged view illustrating another example of the structure of the magnetic recording/reproducing apparatus according to the first embodiment.

Another example in which a magnetic recording/reproducing apparatus 10-1' uses pin-type irreversible adsorbing materials as an irreversible adsorbing materials and is attached to a second opening hole 111-1 will be described.

As illustrated, the magnetic recording/reproducing apparatus 10-1' is provided with an outer cover 120-3 having a fourth opening hole 113-2 having a step instead of the outer cover 120-2 having the fourth opening hole 113-1 without a step. The fourth opening hole 113-2 has, for example, a two-stage hole diameter, a hole diameter of a second opening 113-2*b* on an outside air side is larger than a hole diameter of a first opening 113-2*a* on the top cover 14 side, a region 120-3*a* around the first opening 113-2*a* has a shape extending toward a center of the first opening 113-2*a*, and is a hole having a step. In addition, in the magnetic recording/reproducing apparatus 10-1', the pin-type irreversible adsorbing materials 2-1 is inserted into the fourth opening hole 113-2 of the outer cover 120-3 and the opening hole 111-1 of the top cover 14-1, and is attached such that the head top portion 2-1*a* of the pin-type irreversible adsorbing materials 2-1 is supported by a region 120-3*a* around the first opening 113-2*a* of the fourth opening hole 113-2 of the outer cover 120-3. For example, the first opening 113-2*a* of the fourth opening hole 113-2 of the outer cover 120-3 is smaller than the diameter of the head top portion 2-1*a*, and can have a hole diameter of, for example, 2 to 13 mm. In addition, the second opening 113-2*b* has a hole diameter sufficiently larger than the diameter of the head top portion 2-1*a*, and can have a hole diameter of, for example, 6 to 16 mm.

As described above, in the magnetic recording/reproducing apparatus 10-1', the fourth opening hole 113-2 of the outer cover 120-3 has a stepped shape, and the region by which the head top portion 2-1*a* of the pin-type irreversible adsorbing materials 2-1 is supported is in the outer cover 120-3. Other configurations of the magnetic recording/reproducing apparatus 10-1' are similar to those of the magnetic recording/reproducing apparatus 10-1.

In the magnetic recording/reproducing apparatus 10-1' according to the first embodiment, by using the pin-type irreversible adsorbing materials 2-1 that can be attached to the second opening hole 111-1 from the outside of the housing 101-1 via the fourth opening hole 113-2, the pin-type irreversible adsorbing materials 2-1 can be attached after the top cover 14-1 and the outer cover 120-3 are attached to the case 12 of the housing 101-1. As a result, since the pin-type irreversible adsorbing materials 2-1 can be blocked from air and held until the housing 101-1 of the magnetic recording/reproducing apparatus 10-1' is sealed, the time during which the pin-type irreversible adsorbing materials 2-1 comes into contact with air during the manufacturing of the magnetic recording/reproducing apparatus can be minimized to minimize the risk of deteriorating the adsorption function. In this way, in such a magnetic recording/reproducing apparatus 10-1' according to the first embodiment, since the removal of the contaminated gas by the irreversible adsorbing materials is sufficiently performed, defects such as a head crash hardly occur. In addition, the irreversible adsorbing materials 2-1 can be replaced with a new one without removing the top cover and the outer cover when performing repair or the like.

In addition, the magnetic recording/reproducing apparatus 10-1' can be manufactured in a similar manner to the magnetic recording/reproducing apparatus 10-1 except that the outer cover 120-3 having the fourth opening hole 113-2 having the two-stage hole diameter is used instead of the outer cover 120-2 having the fourth opening hole 113-1 without a step, and the pin-type irreversible adsorbing materials 2-1 are attached such that the head top portion 2-1*a* thereof is supported by a region 120-3*a* around the first opening 113-2*a* of the fourth opening hole 113-2 instead of being supported by the region 101d around the second opening 111-1b of the top cover 14.

Third Embodiment

Figure 10:
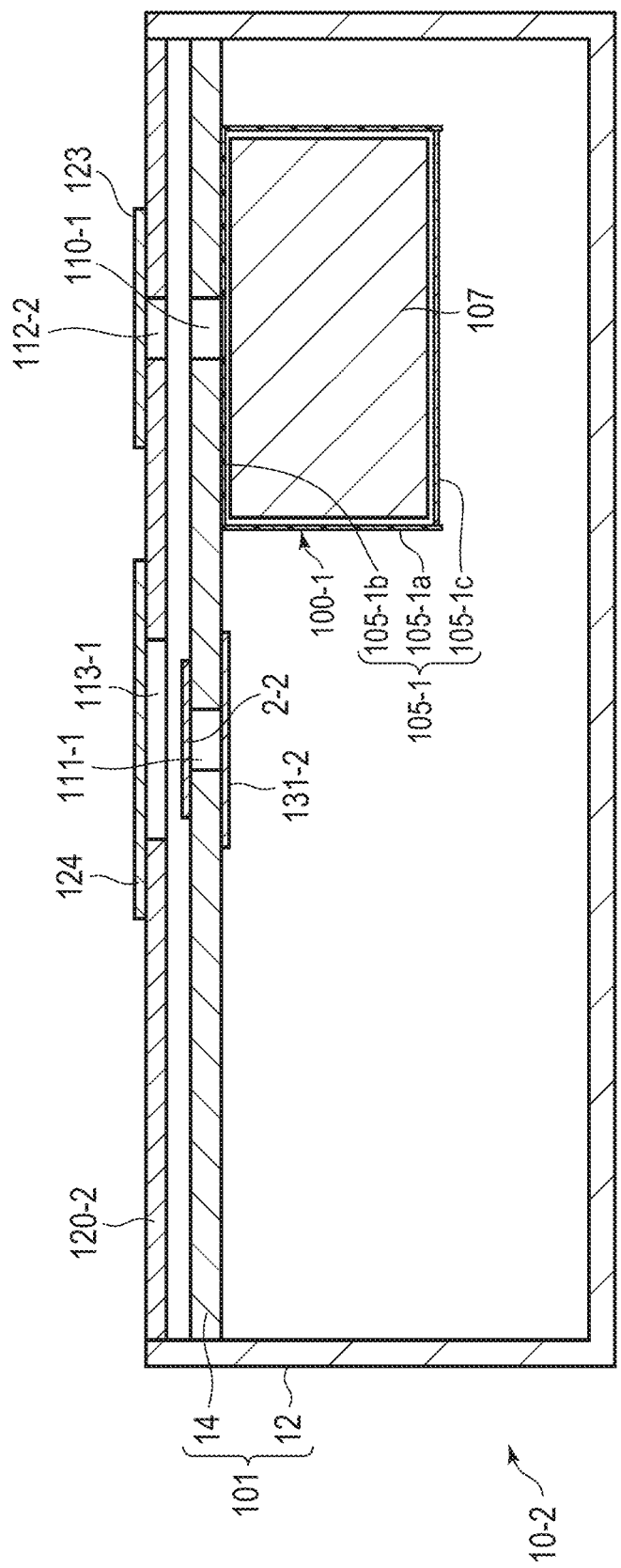
FIG. 10 is a schematic cross-sectional view illustrating another example of the structure of the magnetic recording/reproducing apparatus according to the first embodiment.

FIG. 10 is a schematic cross-sectional view illustrating another example of the structure of the magnetic recording/reproducing apparatus according to the first embodiment.

Figure 11:
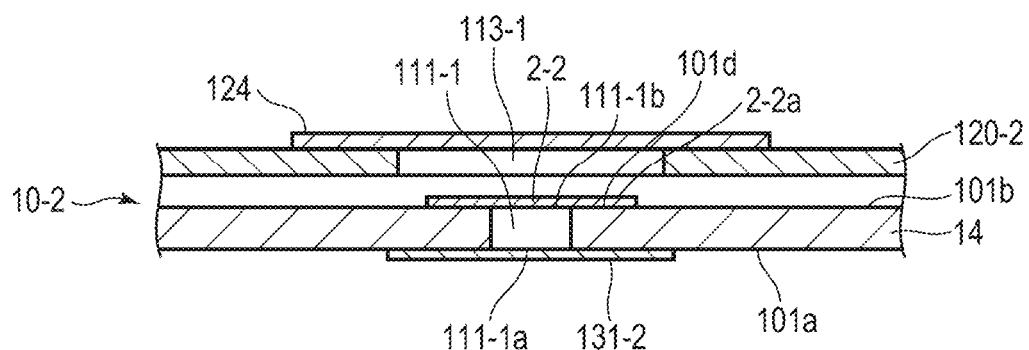
FIG. 11 is a partial enlarged view of FIG. 10.

FIG. 11 is a partial enlarged view of FIG. 10. An example in which a magnetic recording/reproducing apparatus 10-2 uses sheet-type irreversible adsorbing materials 2-2 as irreversible adsorbing materials and is attached to a second opening hole 111-1 will be described.

As illustrated, a housing 101 for the magnetic recording/reproducing apparatus 10-2 includes, for example, a metal case 12 and a metal top cover 14 for sealing the case 12. The case 12 houses components such as a magnetic recording medium and a magnetic head (not illustrated). As a breathing hole communicating from an inside of the housing 101 to outside air, for example, the top cover 14 can be provided with a first opening hole 110-1 for a breathing filter and a second opening hole 111-1 into which an inert gas or the like can be injected. The second opening hole 111-1 connects a first opening 111-1a provided on an inner surface 101a of the top cover 14 and a second opening 111-1b provided on an outer surface 101b of the top cover 14. The inner side of the housing 101-1 of the first opening hole 110-1 is provided with the breathing filter 100-1 that includes a first adsorption layer 107 containing, for example, activated carbon and silica gel, which is used to control the humidity inside the apparatus and is housed in the case 105-1. The case 105-1 includes a main body made of, for example, resin that has a bottom portion 105-1b, a side wall portion 105-1a, and an opening portion facing the bottom portion 105-1b, and an air-permeable membrane filter 105-1c as an air-permeable member provided in the opening portion. In addition, in the second opening hole 111-1, sheet-type irreversible adsorbing materials 2-2 are provided in a region 101d around the second opening hole 111-1 from the outside of the top cover 14.

Figure 12:
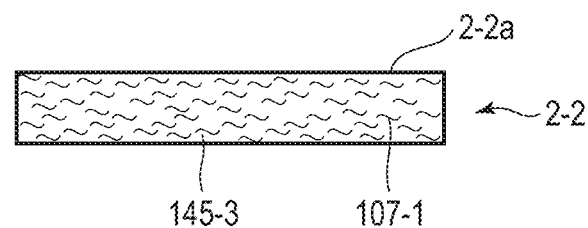
FIG. 12 is a cross-sectional view schematically illustrating an example of sheet-type irreversible adsorbing materials.

FIG. 12 is a cross-sectional view schematically illustrating an example of sheet-type irreversible adsorbing materials.

As the sheet-type irreversible adsorbing materials 2-2, for example, as illustrated in FIG. 12, a woven fabric sheet 145-3 in which an irreversible adsorbent 107-1 processed into a fibrous form is woven can be used. A peripheral edge portion 2-2a of the sheet-type irreversible adsorbing materials 2-2 is supported by the region 101d around the second opening 111-1b. Therefore, a diameter of the sheet-type irreversible adsorbing materials 2-2 is larger than a hole diameter of the second opening 111-1b. In addition, for example, an air-permeable membrane filter 131-2 is provided in the first opening 111-1a on an inner surface 101a side of the second opening hole 111-1 in order to prevent intrusion of dust and the like.

In the magnetic recording/reproducing apparatus 10-1, a flow path between the inside of the housing 101 and the pin-type irreversible adsorbing materials 2-2 is secured via the air-permeable membrane filter 131-2, and the contaminated gas in the housing 101 can be sufficiently adsorbed.

In addition, as illustrated in FIG. 10, the top cover 14 is covered with an outer cover 120-2 welded to the case 12. The outer cover 120-2 is formed of, for example, a metal sheet such as aluminum, and has a third opening hole 112-2 and a fourth opening hole 113-1 at positions facing the first opening hole 110-1 and the second opening hole 111-1 of the top cover 14, respectively. In order to provide the sheet-type irreversible adsorbing materials 2-2 on the top cover 14 via the fourth opening hole 113-1, a hole diameter of the fourth opening hole 113-1 is larger than the size of the sheet-type irreversible adsorbing materials 2-2. The third opening hole 112-2 and the fourth opening hole 113-1 are closed by seals 123 and 124, respectively. Note that the second opening hole 111-1 can have a pore diameter smaller than the size of the sheet-type irreversible adsorbing materials 2-2, and can have a hole diameter of, for example, 2 to 10 mm. In addition, the fourth opening hole 113-1 of the outer cover 120 has a hole diameter sufficiently larger than the size of the sheet-type irreversible adsorbing materials 2-2, and can have a hole diameter of, for example, 4 to 12 mm.

As described above, in the magnetic recording/reproducing apparatus 10-2, the sheet-type irreversible adsorbing materials 2-2 are attached to the second opening hole 111-1. Other configurations of the magnetic recording/reproducing apparatus 10-2 are similar to those of the magnetic recording/reproducing apparatus 10.

In the magnetic recording/reproducing apparatus 10-2 according to the first embodiment, by using the sheet-type irreversible adsorbing materials 2-2 that can be attached to the second opening hole 111-1 from the outside of the housing 101-1 via the fourth opening hole 113-1, the sheet-type irreversible adsorbing materials 2-2 can be attached after the top cover 14 and the outer cover 120-2 are attached to the case 12 of the housing 101. As a result, since the sheet-type irreversible adsorbing materials 2-2 can be blocked from air and held until the housing 101 of the magnetic recording/reproducing apparatus 10-2 is sealed, the time during which the sheet-type irreversible adsorbing materials 2-2 comes into contact with air during the manufacturing of the magnetic recording/reproducing apparatus can be minimized to minimize the risk of deteriorating the adsorption function. In such a magnetic recording/reproducing apparatus 10-2 according to the first embodiment, since the removal of the contaminated gas by the irreversible adsorbing materials is sufficiently performed, defects such as a head crash hardly occur. In addition, the irreversible adsorbing materials 2-2 can be replaced with a new one only by peeling off the seal 124 without removing the top cover and the outer cover when performing repair or the like.

In addition, the magnetic recording/reproducing apparatus 10-2 can be manufactured similarly to the magnetic recording/reproducing apparatus 10 of the first embodiment as another example of the method for manufacturing a magnetic recording/reproducing apparatus according to the second embodiment. However, in the magnetic recording/reproducing apparatus 10-2, instead of the breathing filter 100 having the opening hole 108 in the bottom portion 105b of the case, the breathing filter 100-1 having no opening hole in the bottom portion of the case 105-1 is used. Further, in the magnetic recording/reproducing apparatus 10-2, instead of attaching the pin-type irreversible adsorbing materials 2-1 to the breathing filter 100 from the outside of the housing 101, the sheet-type irreversible adsorbing materials 2-2 are attached to the second opening hole 111-1 from the outside of the housing 101.

According to another example of the method for manufacturing a magnetic recording/reproducing apparatus according to the second embodiment, by using the sheet-type irreversible adsorbing materials 2-2 that can be attached to the second opening hole 111-1 from the outside of the housing in the magnetic recording/reproducing apparatus 10-2, the sheet-type irreversible adsorbing materials 2-2 can be attached to the housing after various tests of the magnetic recording/reproducing apparatus are completed. For this reason, the sheet-type irreversible adsorbing materials 2-2 are blocked from air and held until the housing is sealed, and the time during which the sheet-type irreversible adsorbing materials 2-2 comes into contact with air can be minimized. As a result, in the method for manufacturing a magnetic recording/reproducing apparatus according to the second embodiment, the adsorption performance of the pin-type irreversible adsorbing materials to be used is less likely to deteriorate, and the contaminated gas such as oxygen or siloxane can be sufficiently adsorbed in the magnetic recording/reproducing apparatus after sealing.

Figure 14:
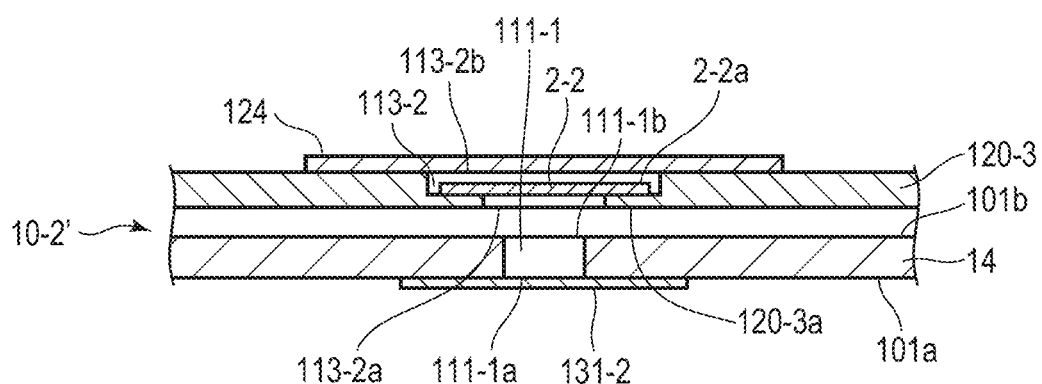
FIG. 14 is a partial enlarged view illustrating another example of the structure of the magnetic recording/reproducing apparatus according to the first embodiment.

FIG. 14 is a partial enlarged view illustrating another example of the structure of the magnetic recording/reproducing apparatus according to the first embodiment.

Another example in which the magnetic recording/reproducing apparatus 10-2' uses sheet-type irreversible adsorbing materials as irreversible adsorbing materials and attached to the second opening hole 111-1 will be described.

As illustrated, the magnetic recording/reproducing apparatus 10-2' is provided with an outer cover 120-3 having a fourth opening hole 113-2 having a step instead of the outer cover 120-2 having the fourth opening hole 113-1 without a step. The fourth opening hole 113-2 has, for example, a two-stage hole diameter, a hole diameter of a second opening 113-2b on an outside air side is larger than a hole diameter of a first opening 113-2a on the top cover 14 side, a region 120-3a around the first opening 113-2a has a shape extending toward a center of the first opening 113-2a, and is a hole having a step. In addition, in the magnetic recording/reproducing apparatus 10-2', the sheet-type irreversible adsorbing materials 2-2 are inserted into the fourth opening hole 113-2 of the outer cover 120-3 and the opening hole 111-1 of the top cover 14, and is attached such that the peripheral edge portion 2-2a of the sheet-type irreversible adsorbing materials 2-2 is supported by a region 120-3a around the first opening 113-2a of the fourth opening hole 113-2 of the outer cover 120-3. For example, the first opening 113-2a of the fourth opening hole 113-2 of the outer cover 120-3 is smaller than the size of the sheet-type irreversible adsorbing materials 2-2, and can have a hole diameter of, for example, 2 to 10 mm. In addition, the second opening 113-2b has a hole diameter sufficiently larger than the size of the sheet-type irreversible adsorbing materials 2-2, and can have a hole diameter of, for example, 4 to 12 mm.

As described above, in the magnetic recording/reproducing apparatus 10-2', the fourth opening hole 113-2 of the outer cover 120-3 has a stepped shape, and the region 120-3a supporting the sheet-type irreversible adsorbing materials 2-2 is in the outer cover 120-3. Other configurations of the magnetic recording/reproducing apparatus 10-2' are similar to those of the magnetic recording/reproducing apparatus 10-2.

In the magnetic recording/reproducing apparatus 10-2' according to the first embodiment, by using the sheet-type irreversible adsorbing materials 2-2 that can be attached to the fourth opening hole 113-2 from the outside of the housing 101, the sheet-type irreversible adsorbing materials 2-2 can be attached after the top cover 14 and the outer cover 120-3 are attached to the case 12 of the housing 101. As a result, since the sheet-type irreversible adsorbing materials 2-2 can be blocked from air and held until the housing 101 of the magnetic recording/reproducing apparatus 10-2' is sealed, the time during which the sheet-type irreversible adsorbing materials 2-2 comes into contact with air during the manufacturing of the magnetic recording/reproducing apparatus can be minimized to minimize the risk of deteriorating the adsorption function. In this way, in such a magnetic recording/reproducing apparatus 10-2' according to the first embodiment, since the removal of the contaminated gas by the irreversible adsorbing materials is sufficiently performed, defects such as a head crash hardly occur. In addition, the irreversible adsorbing materials 2-2' can be replaced with a new one only by peeling off the seal 124 without removing the top cover and the outer cover when performing the repair or the like.

In addition, the magnetic recording/reproducing apparatus 10-2' can be manufactured by applying the method for manufacturing a magnetic recording medium according to the second embodiment in a similar manner to the magnetic recording/reproducing apparatus 10-2 except that the outer cover 120-3 having the fourth opening hole 113-2 having two-stage hole diameter is used instead of the outer cover 120-2 having the fourth opening hole 113-1 without a step, and the sheet-type irreversible adsorbing materials 2-2 are attached so as to be supported by the region 120-3a around the first opening 113-2a of the fourth opening hole 113-2 instead of being supported by the region 101d around the second opening 111-1b of the top cover 14.

The sheet-type irreversible adsorbing materials 2-2 in FIG. 12 are an example of the sheet-type irreversible adsorbing materials that can be used in the magnetic recording/reproducing apparatus 10-2 illustrated in FIG. 11 and the magnetic recording/reproducing apparatus 10-2' illustrated in FIG. 14, and other sheet-type irreversible adsorbing materials can also be used.

Figure 13:
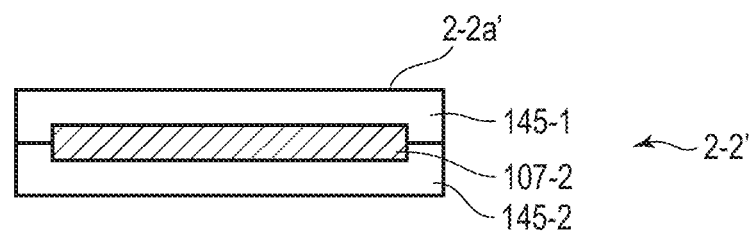
FIG. 13 is a cross-sectional view schematically illustrating another example of the sheet-type irreversible adsorbing materials.

FIG. 13 is a cross-sectional view schematically illustrating another example of the sheet-type irreversible adsorbing materials.

As illustrated in FIG. 13, it is also possible to use a laminated sheet 2-2' or the like in which an irreversible adsorbent 107-2 processed into a sheet shape is arranged and laminated between two air-permeable sheets 145-1 and 145-2 formed of, for example, an air-permeable membrane filter or the like.

Fourth Embodiment

Figure 15:
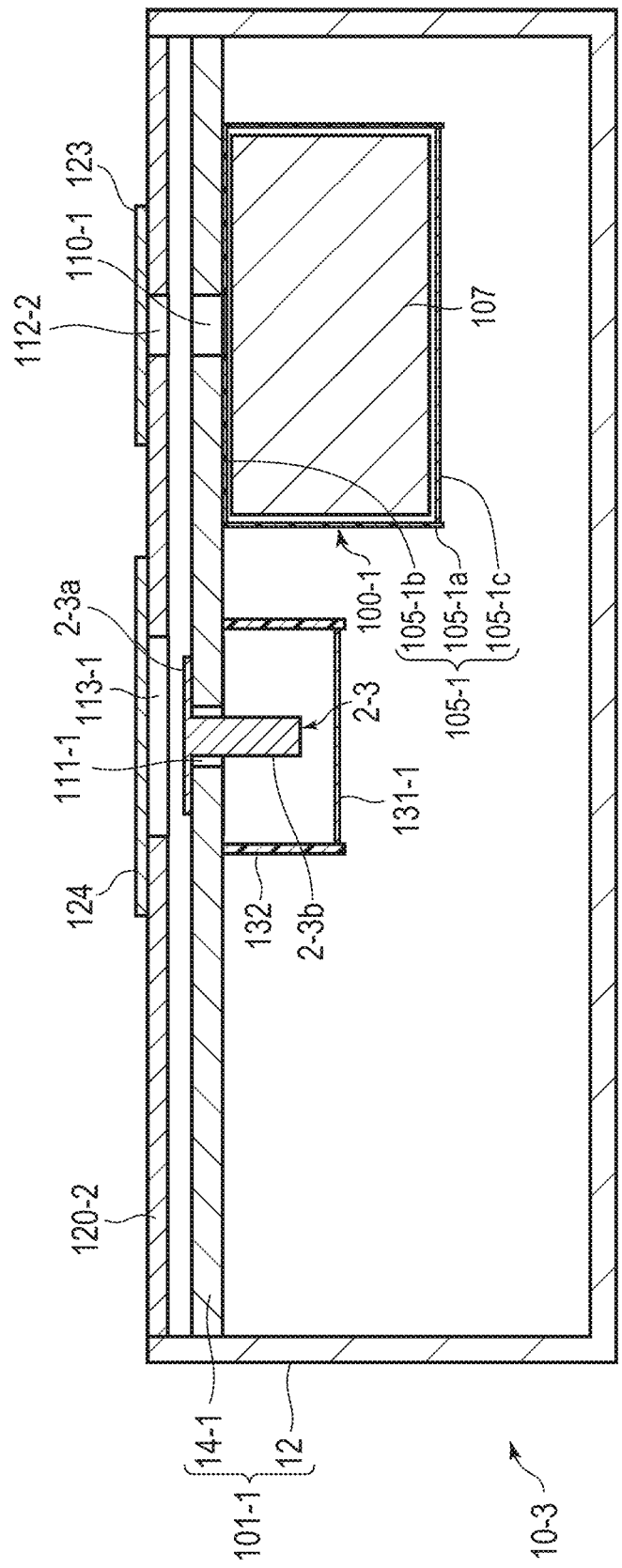
FIG. 15 is a schematic cross-sectional view illustrating another example of the structure of the magnetic recording/reproducing apparatus according to the first embodiment.

FIG. 15 is a schematic cross-sectional view illustrating another example of the structure of the magnetic recording/reproducing apparatus according to the first embodiment.

Figure 16:
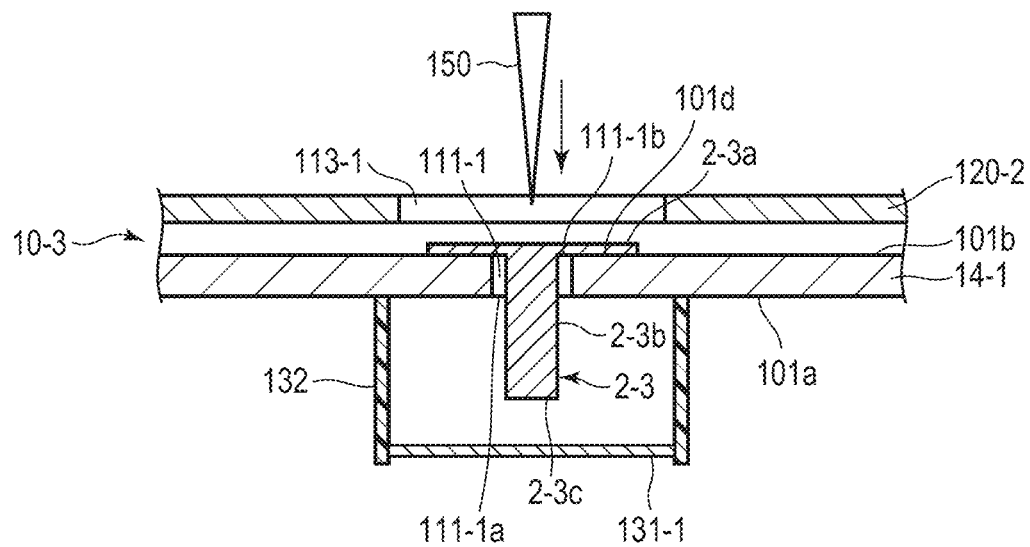
FIG. 16 is a partial enlarged view of FIG. 15.

FIG. 16 is a partial enlarged view of FIG. 15.

An example in which a magnetic recording/reproducing apparatus 10-3 uses a pin-type irreversible adsorbing materials 2-3 in which an adsorbent is sealed as irreversible adsorbing materials and are attached to a second opening hole 111-1 will be described.

As illustrated, a housing 101-1 for the magnetic recording/reproducing apparatus 10-3 includes, for example, a metal case 12 and a metal top cover 14-1 for sealing the case 12. The case 12 houses components such as a magnetic recording medium and a magnetic head (not illustrated). As a breathing hole communicating from the inside of the housing 101-1 to the outside air, for example, the top cover 14-1 can be provided with a first opening hole 110-1 for a breathing filter and a second opening hole 111-1 into which an inert gas or the like can be injected. The second opening hole 111-1 connects a first opening 111-1a provided on an inner surface 101a of the top cover 14-1 and a second opening 111-1b provided on an outer surface 101b of the top cover 14-1. The inner side of the housing 101-1 of the first opening hole 110-1 is provided with the breathing filter 100-1 that includes a first adsorption layer 107 containing, for example, activated carbon and silica gel, which is used to control the humidity inside the apparatus and is housed in the case 105-1. The case 105-1 includes a main body made of, for example, resin which has a bottom portion 105-1b, a side wall portion 105-1a, and an opening portion facing the bottom portion 105-1b, and an air-permeable membrane filter 105-1c as an air-permeable member provided in the opening portion. In addition, the pin-type irreversible adsorbing materials 2-3 are attached to the second opening hole 111-1 from the outside of the top cover 14-1 via the second opening hole 111-1.

Figure 17:
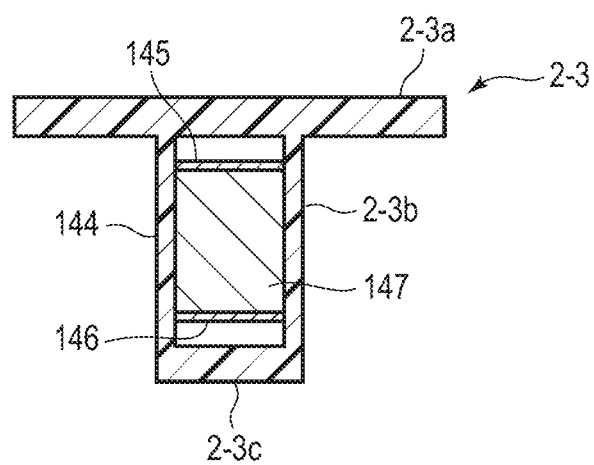
FIG. 17 is a cross-sectional view illustrating a configuration of sealed pin-type irreversible adsorbing materials.

FIG. 17 is a schematic view illustrating a configuration of a sealed pin-type irreversible adsorbing materials.

As illustrated in FIG. 17, the pin-type irreversible adsorbing materials 2-3 include a pin-type case 144 that is made of, for example, a mold resin, a polyacetal resin, or the like, and an irreversible adsorbent 147 that is provided in the case 144 and capable of irreversibly adsorbing the contaminated gas such as oxygen, siloxane, or water vapor. The pin-type case 144 includes a disk-shaped head top portion 2-3a and a cylindrical housing portion 2-3b extending perpendicularly from a central portion of one surface of the head top portion 2-3a, and is sealed to the outside air. Further, an air-permeable member 145 such as an air-permeable membrane filter is provided on the head top portion 2-3a side in the cylindrical housing portion 2-3b at a distance from the head top portion 2-3a, and an air-permeable member 146 such as an air-permeable membrane filter is provided on an end portion 2-3c side facing the head top portion 2-3a in the cylindrical housing portion 2-3b at a distance from the end portion 2-3c. The irreversible adsorbent 147 has, for example, a granular shape, is housed between the air-permeable member 145 and the air-permeable member 146 in the housing portion 2-1b, and is sealed and held by being blocked from air.

The head top portion 2-3a of the pin-type irreversible adsorbing materials 2-3 is supported by a region 101d around a second opening 111-1b. Therefore, a diameter of the head top portion 2-3a is larger than a hole diameter of the second opening 111-1b. In addition, a cylindrical housing portion 2-3b is inserted into the second opening hole 111-1, and protrudes from an inner surface 101a of the top cover 14-1. A side wall 132 made of, for example, resin is provided around the opening 111-1a to surround the protruding cylindrical housing portion 2-3b. For example, an air-permeable membrane filter 131-1 for preventing intrusion of dust and the like is provided on an end surface of the side wall 132 on an inner side of the housing 101-1 at a distance from an end portion of the cylindrical housing portion 2-3b. By providing the membrane filter 131-1 via the side wall 132, it is possible to prevent the membrane filter 131-1 from being damaged when a needle-shaped member 150 penetrates the pin-type irreversible adsorbing materials 2-3.

For example, the magnetic recording/reproducing apparatus 10-3 uses the needle-shaped member 150, and penetrates from the vicinity of a central portion of the top portion 2-3a to the vicinity of the central portion of the end portion 2-3c as indicated by the direction of the arrow, thereby opening the sealed housing portion 2-3b of the pin-type irreversible adsorbing materials 2-3 and activating the irreversible adsorbent 147 that is blocked from air and held in an inactive state. The air-permeable members 145 and 146 are provided to prevent the irreversible adsorbent 147 from coming out when the pin-type irreversible adsorbing materials 2-3 are penetrated. Thereafter, an opening hole 113-1 can be closed by a seal 124. As a result, a flow path between the inside of the housing 101-1 and the inside of the pin-type irreversible adsorbing materials 2-3 is secured via the membrane filter 146 on the end portion 2-3c side, and the contaminated gas in the housing 101-1 can be sufficiently adsorbed.

In addition, as illustrated in FIG. 15, the top cover 14-1 is covered with an outer cover 120-2 welded to the case 12. The outer cover 120-2 is formed of, for example, a metal sheet such as aluminum, and has a third opening hole 112-2 and a fourth opening hole 113-1 at positions facing the first opening hole 110-1 and the second opening hole 111-1 of the top cover 14-1, respectively. In order to provide the pin-type irreversible adsorbing materials 2-1 on the top cover 14-1 via the fourth opening hole 113-1, a hole diameter of the fourth opening hole 113-1 is larger than the size of the head top portion 2-1a. The third opening hole 112-2 and the fourth opening hole 113-1 are closed by seals 123 and 124, respectively.

The second opening hole 111-1 is smaller than the diameter of the head top portion 2-1a, and can have a size equal to or larger than a diameter of the housing portion 2-1b and have a hole diameter of, for example, 2 to 13 mm.

The fourth opening hole 113-1 of the outer cover 120 can have a hole diameter sufficiently larger than the diameter of the head top portion 2-1a, and have a hole diameter of, for example, 6 to 16 mm.

As described above, in the magnetic recording/reproducing apparatus 10-3, the top cover 14-1 in which the sealed pin-type irreversible adsorbing materials 2-3 are attached to the second opening hole 111-1, the side wall 132 made of, for example, a resin surrounding the pin-type irreversible adsorbing materials 2-3 around the opening 111-1a of the second opening hole 111-1, and the air-permeable membrane filter 131-1 on an end surface of the side wall 132 are further provided is used. Other configurations of the magnetic recording/reproducing apparatus 10-3 are similar to those of the magnetic recording/reproducing apparatus 10.

In the magnetic recording/reproducing apparatus 10-3 according to the first embodiment, by using the pin-type irreversible adsorbing materials 2-3 that can be attached to the second opening hole 111-1 from an outside of the housing 101-1 via the fourth opening hole 113-1, the pin-type irreversible adsorbing materials 2-3 can be attached after the top cover 14 and the outer cover 120-2 are attached to the case 12 of the housing 101. In addition, by using the pin-type irreversible adsorbing materials 2-3 in a state in which the irreversible adsorbent 147 is inactive, the irreversible adsorbent 147 can be activated only by penetrating the head top portion 2-3a and the end portion 2-3c using the needle-shaped member 150 immediately before the housing 101-1 is sealed. Therefore, the time during which the irreversible adsorbent 147 of the pin-type irreversible adsorbing materials 2-3 comes into contact with air during the manufacturing of the magnetic recording/reproducing apparatus can be shortened as much as possible, and the risk of deteriorating the adsorption function can be minimized. In such a magnetic recording/reproducing apparatus 10-3 according to the first embodiment, since the removal of the contaminated gas by the irreversible adsorbing materials is sufficiently performed, defects such as a head crash hardly occur. In addition, the irreversible adsorbing materials 2-3 can be replaced with a new one without removing the top cover and the outer cover when performing repair or the like.

Figure 18:
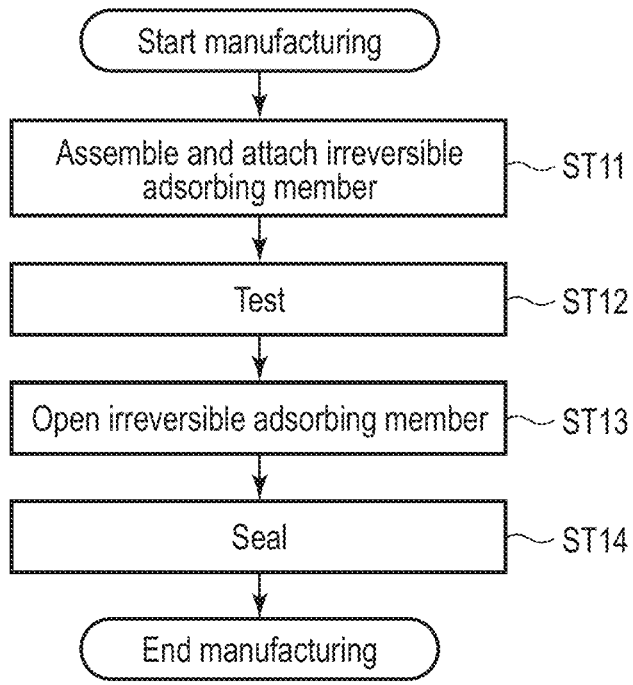
FIG. 18 is a flowchart illustrating an example of a method for manufacturing a magnetic recording/reproducing apparatus according to a third embodiment.

FIG. 18 is a flowchart illustrating an example of a method for manufacturing a magnetic recording/reproducing apparatus according to a third embodiment.

The magnetic recording/reproducing apparatus 10-3 can be manufactured as follows.

As illustrated in FIG. 16, first, a magnetic recording medium (not illustrated), components for a magnetic recording/reproducing apparatus such as a magnetic head, the top cover 14-1, and the outer cover 120-2 are attached to the case 12. Thereafter, by inserting the cylindrical housing portion 2-3b of the pin-type irreversible adsorbing materials 2-3 into the second opening hole 111-1 of the top cover 14-1 from the fourth opening hole 113-1 of the outer cover 120-2, the pin-type irreversible adsorbing materials 2-3 are attached to the housing 101-1, and a portion of the magnetic recording/reproducing apparatus is assembled (ST11).

Next, various tests of the magnetic recording/reproducing apparatus are performed (ST12).

After the test, after the air in the housing 101-1 is exhausted, an inert gas such as helium is introduced from a first opening hole 110-1 via a third opening hole 112-2 to adjust an internal pressure, and as illustrated in FIG. 16, the needle-shaped member 150 penetrates from the vicinity of a central portion of the head top portion 2-3a to the vicinity of a central portion of the end portion 2-3c in the direction of the arrow to open the head top portion 2-3a and the end portion 2-3c, so the sealed sheet-type irreversible adsorbing materials 2-3 are opened (ST13), and the sheet-type irreversible adsorbent 147 that is blocked from air and held in an inactive state is activated.

Subsequently, as illustrated in FIG. 15, by closing the third opening hole 112-2 and the fourth opening hole 113-1 of the outer cover 120-2 using metal seals 123 and 124 made of, for example, aluminum, and the like, the inside of the housing 101-1 is sealed (ST14), thereby obtaining the magnetic recording/reproducing apparatus 10-3.

According to another example of the method for manufacturing a magnetic recording/reproducing apparatus according to the third embodiment, by using the pin-type irreversible adsorbing materials 2-3 that can be attached to the opening hole as a breathing hole from the outside of the housing in the magnetic recording/reproducing apparatus 10-3, the pin-type irreversible adsorbing materials 2-3 can be attached after the top cover 14 and the outer cover 120-2 are attached to the case 12 of the housing 101. In addition, it is possible to attach the pin-type irreversible adsorbing materials 2-3 in a state in which the irreversible adsorbent 147 is inactive, and even if the test is performed after the attachment, the adsorption performance is not deteriorated, and the irreversible adsorbent 147 can be activated only by penetrating the head top portion 2-3a and the end portion 2-3c using the needle-shaped member 150 immediately before the housing 101-1 after the test is sealed. As described above, according to the method for manufacturing a magnetic recording/reproducing apparatus according to the third embodiment, the pin-type irreversible adsorbing materials 2-3 are blocked from air and held until the housing is sealed, and the time during which the pin-type irreversible adsorbing materials 2-3 comes into contact with air can be made as short as possible. As a result, the adsorption performance of the pin-type irreversible adsorbing materials 2-3 to be used is less likely to deteriorate, and the contaminated gas such as oxygen or siloxane can be sufficiently adsorbed in the magnetic recording/reproducing apparatus 10-3 after sealing.

Figure 19:
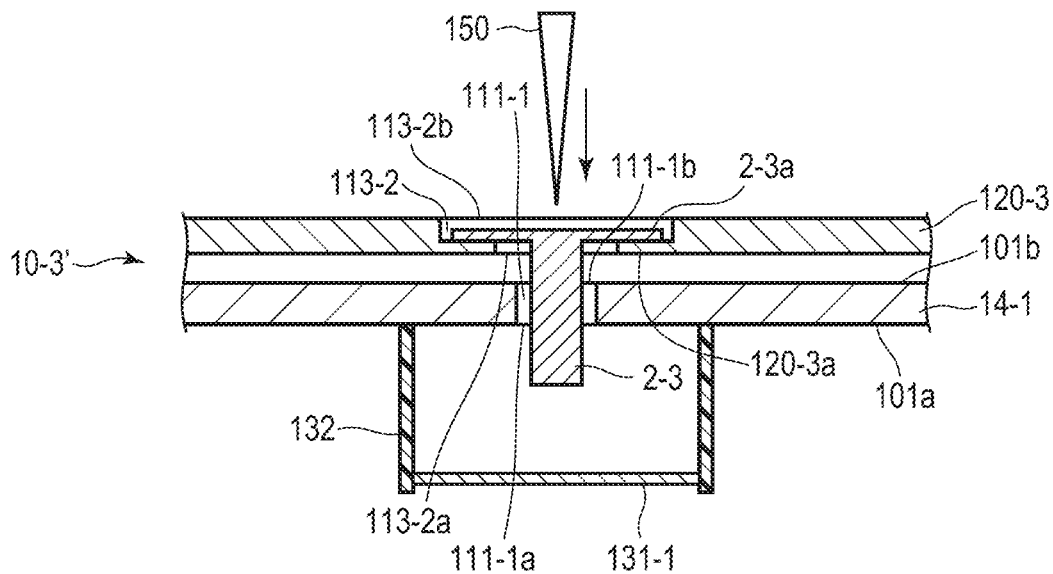
FIG. 19 is a partial enlarged view illustrating another example of the structure of the magnetic recording/reproducing apparatus according to the first embodiment.

FIG. 19 is a partial enlarged view illustrating another example of the structure of the magnetic recording/reproducing apparatus according to the first embodiment.

Another example in which a magnetic recording/reproducing apparatus 10-3' uses pin-type irreversible adsorbing materials as irreversible adsorbing materials and is attached to a second opening hole 111-1 will be described.

As illustrated, the magnetic recording/reproducing apparatus 10-3' is provided with an outer cover 120-3 having a fourth opening hole 113-2 having a step instead of the outer cover 120-2 having the fourth opening hole 113-1 without a step. The fourth opening hole 113-2 has, for example, a two-stage hole diameter, a hole diameter of a second opening 113-2b on an outside air side is larger than a hole diameter of a first opening 113-2a on the top cover 14 side, a region 120-3a around the first opening 113-2a has a shape extending toward a center of the first opening 113-2a, and is a hole having a step. In addition, in the magnetic recording/reproducing apparatus 10-3', the pin-type irreversible adsorbing materials 2-3 are inserted into the fourth opening hole 113-2 of the outer cover 120-3 and the second opening hole 111-1 of the top cover 14-1, and is attached such that the head top portion 2-3a of the pin-type irreversible adsorbing materials 2-3 is supported by a region 120-3a around a first opening 113-2a of the fourth opening hole 113-2 of the outer cover 120-3. For example, the first opening 113-2a of the fourth opening hole 113-2 of the outer cover 120-3 is smaller than the diameter of the head top portion 2-3a, and can have a hole diameter of, for example, 2 to 13 mm. In addition, the second opening 113-2b has a hole diameter sufficiently larger than the diameter of the head top portion 2-1a, and can have a hole diameter of, for example, 6 to 16 mm.

As described above, in the magnetic recording/reproducing apparatus 10-3', the fourth opening hole 113-2 of the outer cover 120-3 has a stepped shape, and the region by which the head top portion 2-3a of the pin-type irreversible adsorbing materials 2-3 is supported is in the outer cover 120-3.

Other configurations of the magnetic recording/reproducing apparatus 10-3' are similar to those of the magnetic recording/reproducing apparatus 10-3.

In the magnetic recording/reproducing apparatus 10-3' according to the first embodiment, by using the pin-type irreversible adsorbing materials 2-3 that can be attached to the second opening hole 111-1 from the outside of the housing 101-1 via the fourth opening hole 113-2, the pin-type irreversible adsorbing materials 2-3' can be attached after the top cover 14-1 and the outer cover 120-3 are attached to the case 12 of the housing 101-1. In addition, by using the pin-type irreversible adsorbing materials 2-3 in a state in which the irreversible adsorbent 147 is inactive, the irreversible adsorbent 147 can be activated only by penetrating the head top portion 2-3a and the end portion 2-3c using the needle-shaped member 150 immediately before the housing 101-1 is sealed. Therefore, the time during which the irreversible adsorbent 147 of the pin-type irreversible adsorbing materials 2-3 comes into contact with air during the manufacturing of the magnetic recording/reproducing apparatus can be shortened as much as possible, and the risk of deteriorating the adsorption function can be minimized. As described above, in the magnetic recording/reproducing apparatus 10-3 according to the first embodiment, since the removal of the contaminated gas by the irreversible adsorbing materials is sufficiently performed, defects such as a head crash hardly occur. In addition, the irreversible adsorbing materials 2-3 can be replaced with a new one without removing the top cover and the outer cover when performing repair or the like.

In addition, the magnetic recording/reproducing apparatus 10'-3 can be manufactured in a similar manner to the magnetic recording/reproducing apparatus 10-3 except that the outer cover 120-3 having the fourth opening hole 113-2 having the two-stage hole diameter is used instead of the outer cover 120-2 having the fourth opening hole 113-1 without a step, and the pin-type irreversible adsorbing materials 2-3' are attached such that the head top portion 2-1a thereof is supported by a region 120-3a around the first opening 113-2a of the fourth opening hole 113-2 provided on the outer cover 120-3 instead of being supported by the region 101d around the second opening 111-1b of the top cover 14.

Fifth Embodiment

Figure 20:
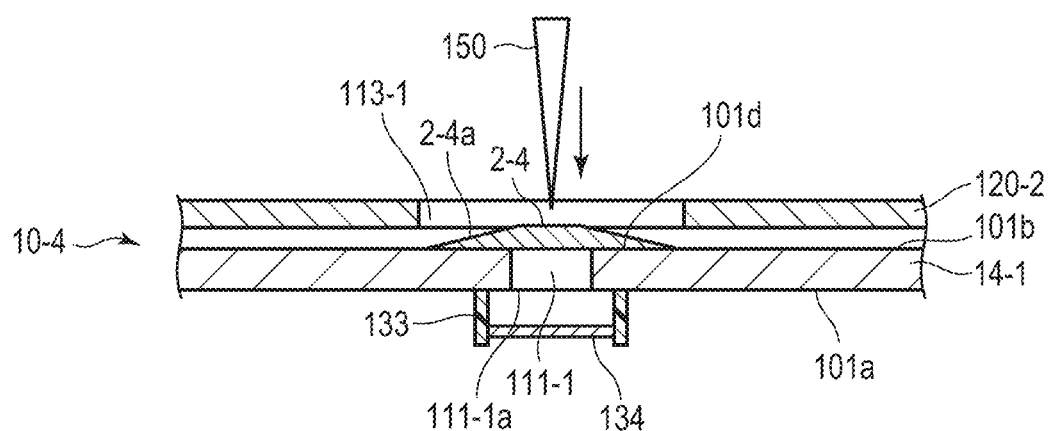
FIG. 20 is a partial view of a magnetic recording/reproducing apparatus to which another example of sealed irreversible adsorbing materials are applied.

FIG. 20 is a partial view of a magnetic recording/reproducing apparatus 10-4 to which another example of sealed irreversible adsorbing materials is applied.

Figure 21:
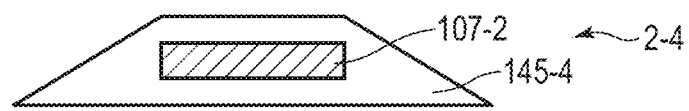
FIG. 21 is a cross-sectional view illustrating a configuration of sealed sheet-type irreversible adsorbing materials.

FIG. 21 is a cross-sectional view illustrating a configuration of sealed bag-type irreversible adsorbing materials.

As illustrated, a sealed bag-type irreversible adsorbing materials 2-4 have a configuration in which an irreversible adsorbent 107-2 is sealed into an airtight bag-shaped case 145-4 such as a bag of an aluminum deposited sheet or a PTS bag manufactured by MITSUBISHI GAS CHEMICAL COMPANY, INC., and can be applied to the magnetic recording/reproducing apparatus illustrated in FIG. 15 instead of sealed pin-type irreversible adsorbing materials 2-3. In addition, at this time, instead of a side wall 132 made of a resin, a side wall 133 that has a height lower than a height of the side wall 132 made of a resin and has a short distance from the second opening hole 111-1 can be used. Further, for example, an air-permeable membrane filter 134 for preventing intrusion of dust or the like can be provided on an end surface of the side wall 133 of the housing 101-1 at a sufficient distance from the second opening hole 111-1. By providing the membrane filter 134 via the side wall 133, it is possible to prevent the membrane filter 134 from being damaged when a needle-shaped member 150 penetrates the bag-type irreversible adsorbing materials 2-4.

Similarly to the magnetic recording/reproducing apparatus 10-3, the magnetic recording/reproducing apparatus 10-4 can open the sealing of the bag-type irreversible adsorbing materials 2-4 by penetrating from the vicinity of a central portion of one surface to the vicinity of the central portion of the other surface of the bag-type irreversible adsorbing materials 2-4 as indicated by the direction of the arrow using the needle-shaped member 150, and can activate the irreversible adsorbent which is blocked from air and held in an inactive state. Thereafter, a fourth opening hole 113-1 can be closed by a seal 124 in the same manner as the magnetic recording/reproducing apparatus 10-3. As a result, a flow path between the inside of the housing 101-1 and the inside of the bag-type irreversible adsorbing materials 2-4 is secured, and the contaminated gas in the housing 101-1 can be sufficiently adsorbed.

In the magnetic recording/reproducing apparatus 10-4 according to the first embodiment, similarly to the magnetic recording/reproducing apparatus 10-3, by using the bag-type irreversible adsorbing materials 2-4 that can be attached to the second opening hole 111-1 from the outside of the housing 101-1 via the fourth opening hole 113-1, the bag-type irreversible adsorbing materials 2-4 can be attached after the top cover 14 and the outer cover 120-2 are attached to the case 12 of the housing 101. In addition, it is possible to attach the bag-type irreversible adsorbing materials 2-4 in a state in which the irreversible adsorbent is in an inactive and to activate the irreversible adsorbent only by penetrating the bag-type irreversible adsorbing materials 2-4 using the needle-shaped member 150 immediately before the housing 101-1 is sealed. Therefore, the time during which the irreversible adsorbent of the bag-type irreversible adsorbing materials 2-4 comes into contact with air during the manufacturing of the magnetic recording/reproducing apparatus can be shortened as much as possible, and the risk of deteriorating the adsorption function can be minimized. In such a magnetic recording/reproducing apparatus 10-4 according to the first embodiment, since the removal of the contaminated gas by the irreversible adsorbing materials is sufficiently performed, defects such as a head crash hardly occur. In addition, the irreversible adsorbing materials 2-4 can be replaced with a new one without removing the top cover and the outer cover when performing repair or the like.

In addition, the magnetic recording/reproducing apparatus 10-4 can be manufactured in a similar manner to the magnetic recording/reproducing apparatus 10-3 as illustrated in the flowchart of FIG. 18 by applying the method for manufacturing a magnetic recording/reproducing apparatus according to the third embodiment.

Using another example of the method for manufacturing a magnetic recording/reproducing apparatus according to the third embodiment, by using the bag-type irreversible adsorbing materials 2-4 that can be attached to the opening hole as the breathing hole from the outside of the housing in the magnetic recording/reproducing apparatus 10-4, the bag-type irreversible adsorbing materials 2-4 can be attached after the top cover 14-1 and the outer cover 120-2 are attached to the case 12 of the housing 101-1. In addition, it is possible to attach the bag-type irreversible adsorbing materials 2-4 in a state in which the irreversible adsorbent is inactive, and even if the test is performed after the attachment, the adsorption performance is not deteriorated, and the irreversible adsorbent can be activated only by penetrating the bag-type irreversible adsorbing materials 2-4 using the needle-shaped member 150 immediately before the housing 101-1 after the test is sealed. As described above, according to the method for manufacturing a magnetic recording/reproducing apparatus according to the third embodiment, the bag-type irreversible adsorbing materials 2-4 are blocked from air and held until the housing is sealed, and the time during which the bag-type irreversible adsorbing materials 2-4 comes into contact with air can be made as short as possible. As a result, the adsorption performance of the bag-type irreversible adsorbing materials 2-4 to be used is less likely to deteriorate, and the contaminated gas such as oxygen or siloxane can be sufficiently adsorbed in the magnetic recording/reproducing apparatus 10-4 after sealing.

Figure 22:
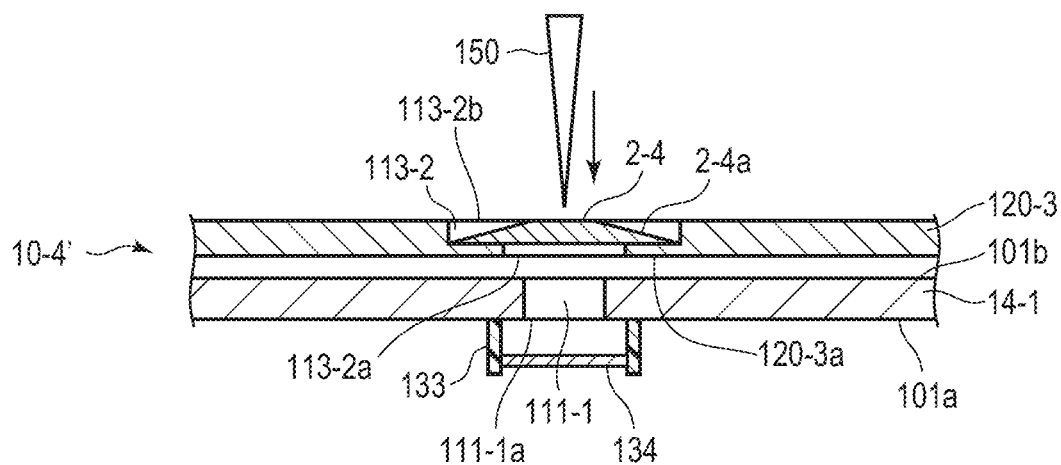
FIG. 22 is a partial view of the magnetic recording/reproducing apparatus to which still another example of the sealed irreversible adsorbing materials is applied.

FIG. 22 is a partial view of a magnetic recording/reproducing apparatus 10-4' to which another example of a sealed irreversible adsorbing materials is applied.

As illustrated, the magnetic recording/reproducing apparatus 10-4' is provided with an outer cover 120-3 having a fourth opening hole 113-2 having a step instead of the outer cover 120-2 having the fourth opening hole 113-1 without a step. The fourth opening hole 113-2 has, for example, a two-stage hole diameter, a hole diameter of a second opening 113-2b on an outside air side is larger than a hole diameter of the first opening 113-2a on the top cover 14-1 side, a region 120-3a around a first opening 113-2a has a shape extending toward a center of the first opening 113-2a, and is a hole having a step. In addition, in the magnetic recording/reproducing apparatus 10-4', the bag-type irreversible adsorbing materials 2-4 are inserted into the fourth opening hole 113-2 of the outer cover 120-3, and a peripheral edge portion 2-4a of the bag-type irreversible adsorbing materials 2-4 are attached so as to be supported by the region 120-3a around the first opening 113-2a of the fourth opening hole 113-2 provided in the outer cover 120-3. For example, the first opening 113-2a of the fourth opening hole 113-2 provided in the outer cover 120-3 is smaller than the size of the bag-type irreversible adsorbing materials 2-4, for example, 4 to 15 mm, and can have a hole diameter of, for example, 3 to 14 mm. In addition, the second opening 113-2b has a hole diameter sufficiently larger than the size of the bag-type irreversible adsorbing materials 2-2, and can have a hole diameter of, for example, 5 to 16 mm.

As described above, in the magnetic recording/reproducing apparatus 10-4', the fourth opening hole 113-2 of the outer cover 120-3 has a stepped shape, and the region 120-3a supporting the bag-type irreversible adsorbing materials 2-4 is in the outer cover 120-3. Other configurations of the magnetic recording/reproducing apparatus 10-4' are similar to those of the magnetic recording/reproducing apparatus 10-4.

In the magnetic recording/reproducing apparatus 10-4' according to the first embodiment, by using the bag-type irreversible adsorbing materials 2-4 that can be attached to the second opening hole 111-1 from the outside of the housing 101-1 via the fourth opening hole 113-1, the bag-type irreversible adsorbing materials 2-4 can be attached after the top cover 14 and the outer cover 120-3 are attached to the case 12 of the housing 101. In addition, in the magnetic recording/reproducing apparatus 10-4' according to the first embodiment, it is possible to attach the bag-type irreversible adsorbing materials 2-4 in a state in which the irreversible adsorbent is inactive, and the irreversible adsorbent can be activated only by penetrating the bag-type irreversible adsorbing materials 2-4 using the needle-shaped member 150 immediately before the housing 101-1 is sealed. Therefore, the time during which the irreversible adsorbent of the bag-type irreversible adsorbing materials 2-4 comes into contact with air during the manufacturing of the magnetic recording/reproducing apparatus 10-4' can be shortened as much as possible, and the risk of deteriorating the adsorption function can be minimized. In such a magnetic recording/reproducing apparatus 10-4' according to the first embodiment, since the removal of the contaminated gas by the irreversible adsorbing materials is sufficiently performed, defects such as a head crash hardly occur. In addition, the irreversible adsorbing materials 2-4 can be replaced with a new one without removing the top cover and the outer cover when performing repair or the like.

Furthermore, the magnetic recording/reproducing apparatus 10-4' can be manufactured in the same manner as the magnetic recording/reproducing apparatus 10-4 by applying the method for manufacturing a magnetic recording/reproducing apparatus according to the third embodiment as illustrated in the flowchart of FIG. 18. Using another example of the method for manufacturing a magnetic recording/reproducing apparatus according to the third embodiment, by using the bag-type irreversible adsorbing materials 2-4 that can be attached to the opening hole as the breathing hole from the outside of the housing in the magnetic recording/reproducing apparatus 10-4', the bag-type irreversible adsorbing materials 2-4 can be attached after the top cover 14-1 and the outer cover 120-2 are attached to the case 12 of the housing 101-1. In addition, it is possible to attach the bag-type irreversible adsorbing materials 2-4 in a state where the irreversible adsorbent is inactive, and even if the test is performed after the attachment, the adsorption performance is not deteriorated, and the irreversible adsorbent can be activated only by penetrating the bag-type irreversible adsorbing materials 2-4 using the needle-shaped member 150 immediately before the housing 101-1 after the test is sealed. As described above, according to the method for manufacturing a magnetic recording/reproducing apparatus according to the third embodiment, the bag-type irreversible adsorbing materials 2-4 are blocked from air and held until the housing is sealed, and the time during which the bag-type irreversible adsorbing materials 2-4 comes into contact with air can be made as short as possible. As a result, the adsorption performance of the bag-type irreversible adsorbing materials 2-4 to be used is less likely to deteriorate, and the contaminated gas such as oxygen or siloxane can be sufficiently adsorbed in the magnetic recording/reproducing apparatus 10-4' after sealing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording/reproducing apparatus comprising:
   a sealed housing comprising a case for the magnetic recording/reproducing apparatus, a first cover covering the case and including a first hole, and a second cover covering the case over the first cover; and
   irreversible moisture adsorbing materials provided in the first hole and on an inner side of the first cover, and housing an irreversible moisture absorbent which does not desorb moisture,
   wherein the second cover comprises a second hole which is provided at a position facing the first hole and includes a second size larger than a first size of a head top portion of the irreversible moisture adsorbing materials, and a seal material which seals the housing and is provided outside of the second hole.

2. The magnetic recording/reproducing apparatus according to claim 1,
   wherein the irreversible moisture adsorbing materials comprise the head top portion, a housing portion which communicates with the head top portion and protrudes from the inner surface of the first cover, and the irreversible moisture adsorbent provided in the housing portion,
   wherein the head top portion includes the first size larger than a third size of the first hole, and is supported by a region around the first hole of the first cover.

3. The magnetic recording/reproducing apparatus according to claim 2, wherein the third size is a first hole diameter of the first hole.

4. The magnetic recording/reproducing apparatus according to claim 2, wherein the housing portion is a cylindrical housing portion.

5. The magnetic recording/reproducing apparatus according to claim 1, further comprising a side wall surrounding the irreversible moisture adsorbing materials is provided around an outer opening of the first hole, an air-permeable membrane filter provided on an end surface of the side wall on the inner side of the first cover.

6. The magnetic recording/reproducing apparatus according to claim 1, wherein the first size is a first diameter of the head top portion.

7. The magnetic recording/reproducing apparatus according to claim 1, wherein the second size is a second hole diameter of the second hole.

8. The magnetic recording/reproducing apparatus according to claim 1, wherein the head top portion is a disk-shaped head top portion.

* * * * *